(12) United States Patent
Hatanaka et al.

(10) Patent No.: US 7,478,437 B2
(45) Date of Patent: Jan. 13, 2009

(54) INFORMATION PROCESSING APPARATUS AND METHOD, AND PROGRAM STORING MEDIUM

(75) Inventors: Mitsuyuki Hatanaka, Kanagawa (JP); Mikiko Sakurai, Kanagawa (JP)

(73) Assignee: Sony Corporation, Tokyo (JP)

( * ) Notice: Subject to any disclaimer, the term of this patent is extended or adjusted under 35 U.S.C. 154(b) by 390 days.

(21) Appl. No.: 09/975,827

(22) Filed: Oct. 11, 2001

(65) Prior Publication Data
US 2002/0078037 A1 Jun. 20, 2002

(30) Foreign Application Priority Data
Oct. 12, 2000 (JP) ............................. 2000-311803

(51) Int. Cl.
*G06F 17/30* (2006.01)
(52) U.S. Cl. .............................. 726/31; 726/32; 726/33
(58) Field of Classification Search .................... 707/3, 707/9, 101, 204, 10; 711/161; 360/55, 62, 360/60, 6, 15; 705/51, 52, 57; 726/26, 31–33; 380/201, 203; 723/31
See application file for complete search history.

(56) References Cited

U.S. PATENT DOCUMENTS

| | | | | |
|---|---|---|---|---|
| 5,761,699 | A * | 6/1998 | Hatanaka | 711/101 |
| 5,956,716 | A * | 9/1999 | Kenner et al. | 707/10 |
| 6,034,832 | A * | 3/2000 | Ichimura et al. | 360/60 |
| 6,208,802 | B1 * | 3/2001 | Mori et al. | 386/96 |
| 6,473,756 | B1 * | 10/2002 | Ballard | 707/6 |
| 6,502,194 | B1 * | 12/2002 | Berman et al. | 726/28 |
| 6,601,046 | B1 * | 7/2003 | Epstein | 705/57 |
| 6,615,192 | B1 * | 9/2003 | Tagawa et al. | 705/57 |
| 6,687,802 | B1 * | 2/2004 | Kori et al. | 711/163 |
| 6,731,312 | B2 * | 5/2004 | Robbin | 715/792 |
| 7,096,268 | B1 * | 8/2006 | Shoda et al. | 709/229 |
| 2003/0036974 | A1 * | 2/2003 | Allen | 705/27 |

OTHER PUBLICATIONS

"Microsoft Press Compster Dicitionary, Third Edition" © 1997 Microsoft Corp. p. 37.*

Abcde_0.8.8.orig.tar.gz © 1999 Robert Woodcock. Available at http://lly.org/~rcw/abcde/old/ Excerpts of file README (p. 1) and "abcde" (pp. 1-9).*

(Continued)

*Primary Examiner*—KimYen Vu
*Assistant Examiner*—Thomas Gyorfi
(74) *Attorney, Agent, or Firm*—Oblon, Spivak, McClelland, Maier & Neustadt, P.C.

(57) ABSTRACT

A play list of audio recordings made in the past is searched for, and is displayed in the event that it exists. The contents that have already been recorded in the past are displayed with the word "recorded" affixed thereto in a manner corresponding with the track Nos. of the CD, and are further displayed with a number such as "2" affixed thereto in the event that the contents have been recorded twice in the past, for example. Further, in the event that play lists exist, a dialog box prompting selection of a play list is displayed, so the user can select between audio recording by adding the new contents to an already-existing play list or audio recording by creating a new play list. Thus, the contents recorded in the past are automatically searched, and the user is presented with a display thereof.

31 Claims, 16 Drawing Sheets

OTHER PUBLICATIONS iBasics: iTunes, Part 1 Encode, Organize Radio, and Play. Published Apr. 4, 2001 http://www.lowendmac.com/ibasics/010404.html.*
iBasics: iTunes, Part 2 Burning CDs. Published Apr. 11, 2001. http://www.lowendmac.com/ibasics/010411.html.*
Chvatik, Daniel. "Review: Itunes 1.0" Published Feb. 2001. http://www.atpm.com/7.02/itunes.shtml.*
C-Net News.com. "Apple Wins iTunes Interface Patent" http://www.news.com/2102-1041_3-5210733.html.*
Slashdot.org "Apple Wins iTunes Interface Patent" http://apple.slashdot.org/article.pl?sid=04/05/12/1616252.*
"ITunes Version History" from Wikipedia.org http://en.wikipedia.org/wiki/Itunes_version_history.*

* cited by examiner

FIG. 4

```
DISCID = 55443322
DTITLE = KING/RIDING
TITLE0 = RIDING
TITLE1 = TEN LONG
TITLE2 = KEY
TITLE3 =MARY
TITLE4 = THREE
TITLE5 = HELP
TITLE6 = I
TITLE7 = WORRIED
TITLE8 =
TITLE9 =
EXTD = ARTIST : KING
EXTD = URL1 : ARTIST DISCOGRAPHY http://www.cdnew.co.jp/artist.asp.artistid = 1122
EXTD = URL2 : CDNEW JAPAN HOME http://www.cdnew.co.jp/index.asp
```

INFORMATION PROCESSING APPARATUS AND METHOD, AND PROGRAM STORING MEDIUM

BACKGROUND OF THE INVENTION

1. Field of the Invention

The present invention relates to an information processing apparatus and method, and program storing medium, and particularly relates to an information processing apparatus and method, and program storing medium, for, at the time of at the time of recording contents stored on a first recording medium onto a second recording medium, searching for and displaying information regarding contents stored on the first recording medium, which is already recorded on the second recording medium.

2. Description of the Related Art

Some information processing apparatuses such as personal computers are capable of reading out contents such as music data from CDs (Compact Disks) and the like and recording the contents read out therefrom to recording media such as hard disks or the like (i.e., making audio recordings of the contents).

However, there has been a problem in that in the event that contents already recorded on a recording medium are to be readout from a CD and recorded again with the bit-rate or the like thereof changed, checking how many times the contents already recorded have been recorded necessitates the user to display a list of contents recorded on the recording medium and searching through all of the contents one by one, so in the event that the number of the contents already recorded therein is in the hundreds or thousands, the searching task is extremely troublesome. Also, in the event of recording the contents again without searching for music data already recorded, information of the contents such as the artist name, album title, and titles must be edited again from the beginning, and further, there is the possibility that exactly the same contents may be recorded with the same bit-rate, which would be a waste of hard disk capacity.

SUMMARY OF THE INVENTION

The present invention has been made in light of the above problems, and accordingly it is an object thereof to search for and display already-recorded contents information at the time of recording contents such as music data onto a recording medium.

The information processing apparatus according to the present invention comprises: recording means for recording the contents recorded on the first recording medium onto the second recording medium; recording history information storing means for storing information regarding the contents as recording history information at the time of the contents recorded on the first recording medium being recorded onto the second recording medium by the recording means; and display means for searching for information regarding the contents stored as recording history information by the recording history information storing means at the time of the contents recorded on the first recording medium being recorded onto the second recording medium again by the recording means, and displaying the information.

The recording history information may contain audio recording history information which records the number of times that audio recording has been made for each track of the first recording medium, title saving information of the contents, and play list information.

The information processing method according to the present invention comprises: a recording step for recording the contents recorded on the first recording medium onto the second recording medium; a recording history information storing step for storing information regarding the contents as recording history information at the time of the contents recorded on the first recording medium being recorded onto the second recording medium by the processing in the recording step; and a display step for searching for information regarding the contents stored as recording history information by the processing in the recording history information storing step at the time of the contents recorded on the first recording medium being recorded onto the second recording medium again by the processing in the recording step, and displaying the information.

The program stored in the program storing medium according to the present invention comprises: code for a recording control step for controlling recording of the contents recorded on the first recording medium onto the second recording medium; code for a recording history information storing control step for controlling storing of information regarding the contents as recording history information at the time of the contents recorded on the first recording medium being recorded onto the second recording medium by the processing in the recording control step; and code for a display step for searching for information regarding the contents stored as recording history information by the processing in the recording history information storing control step at the time of the contents recorded on the first recording medium being recorded onto the second recording medium again by the processing in the recording control step, and controlling displaying of the information.

With the information processing apparatus and method, and program storing medium, according to the present invention, at the time of contents recorded on a first recording medium being recorded onto a second recording medium, information regarding the contents is stored as recording history information, and at the time of the contents recorded on the first recording medium being recorded to the second recording medium again, the information regarding the contents stored as recording history information is searched for and displayed.

BRIEF DESCRIPTION OF THE DRAWINGS

FIG. 4 is a diagram describing title saving information;

DESCRIPTION OF THE PREFERRED EMBODIMENTS

Figure 1:
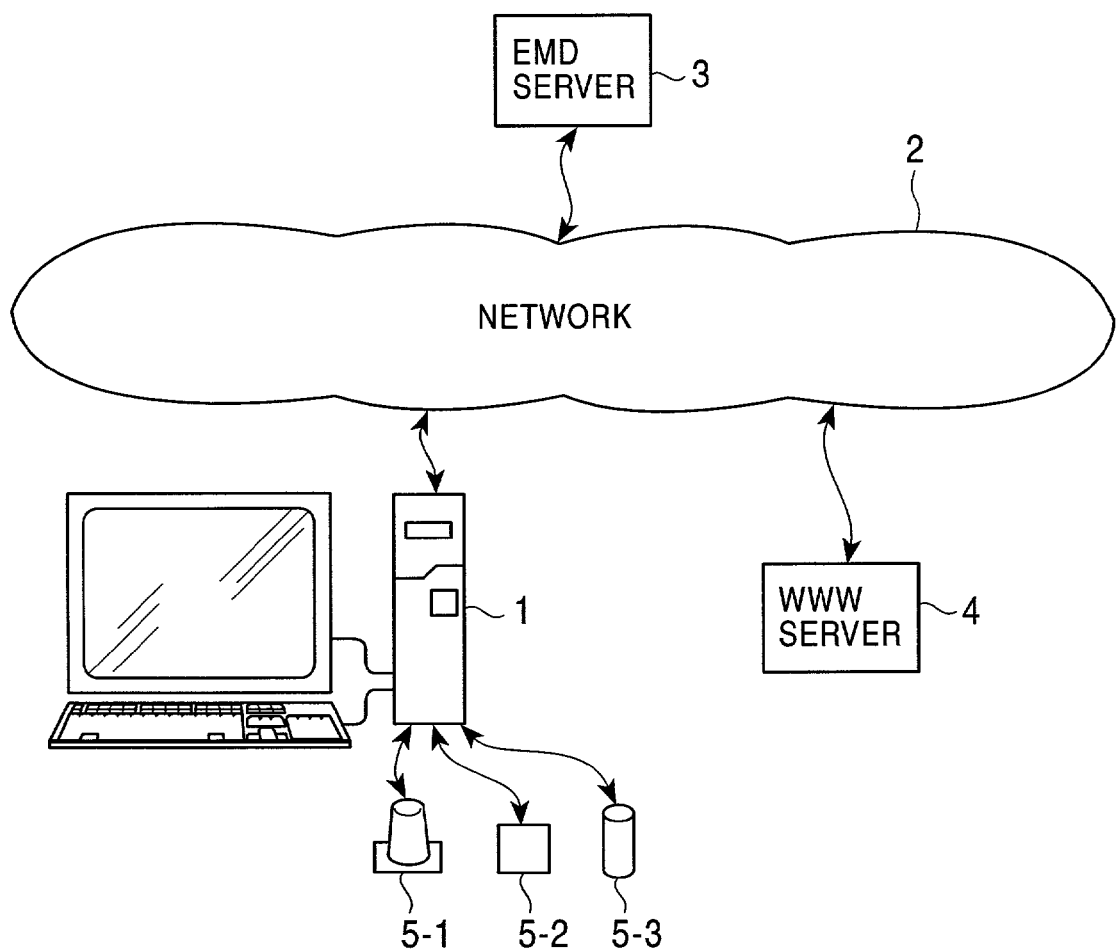
FIG. 1 is a diagram illustrating an embodiment of the music data managing system according to the present invention.

FIG. 1 is a diagram illustrating an embodiment of the contents data managing system according to the present invention. A personal computer 1 is connected to a network 2 comprising a Local Area Network, the Internet, or the like. The personal computer 1 takes music data received from an EMD (Electrical Music Distribution) server 3 or read from a CD (Compact Disk) (such music data will hereafter be referred to as "contents") and either records the contents as such, or converts the contents into a predetermined compression format (e.g., ATRAC3 (Registered Trademark)) and also encrypts the contents with an encrypting format such as DES (Data Encryption Standard) and then records the contents.

The personal computer 1 records rights information indicating usage conditions of the contents, corresponding to the contents recorded as enciphered data.

The rights information indicates, for example, the number of portable devices (hereafter also referred to as simply "PD") which can simultaneously use the contents corresponding to the rights information (the number of PDs which can check-out, as described later). Even in the event that there has been check-out of the contents to the number of times indicated in the rights information, the personal computer 1 is capable of playing the contents.

Also, the rights information indicates that copies can be made. In the event that the contents are copied to the portable devices 5-1 through 5-3, the personal computer 1 is still capable of playing the contents recorded therein. The number of times that the contents can be recorded to the portable devices 5-1 through 5-3 may be restricted. In this case, the number of times that copies can be made never increases.

Also, the rights information indicates whether or not the contents can be moved to another personal computer, and so forth. After the contents are moved to the portable devices 5-1 through 5-3, the contents recorded in the personal computer 1 cannot be used any more (either the contents are deleted, or the usage conditions are changed so that the contents are no longer usable).

The personal computer 1 stores the contents which are recorded in an encrypted state along with the data relating to the contents (i.e., music piece title, playing conditions, etc.) to the portable device 5-1 that is connected thereto via a USB (Universal Serial Bus) cable, and also updates the rights information corresponding to the stored contents in accordance with the storing of the contents in the portable device 5-1 (hereafter referred to as "check-out"). More specifically, in the event of check-out, the number of times that check-out can be performed in the rights information corresponding to the contents recorded in the personal computer 1 is decremented by 1. When the number of times that check-out can be made reaches zero, the corresponding contents cannot be checked-out.

The personal computer 1 stores the contents which are recorded in an encrypted state along with the data relating to the contents to the portable device 5-2 that is connected thereto via a USB cable, and also updates the rights information corresponding to the stored contents in accordance with the storing of the contents in the portable device 5-2. The personal computer 1 stores the contents which are recorded in an encrypted state along with the data relating to the contents to the portable device 5-3 that is connected thereto via a USB cable, and also updates the rights information corresponding to the stored contents in accordance with the storing of the contents in the portable device 5-3.

Also, the personal computer 1 causes the portable device 5-1 connected thereto via a USB cable to delete (or render unusable) the contents which the personal computer 1 has checked-out to the portable device 5-1, and updates the rights information corresponding to the deleted contents (hereafter referred to as "check-in"). More specifically, at the time of check-in, the number of times that check-out can be performed in the rights information corresponding to the contents recorded in the personal computer 1 is incremented by 1.

The personal computer 1 causes the portable device 5-2 connected thereto via a USB cable to delete (or render unusable) the contents which the personal computer 1 has checked-out to the portable device 5-2, and updates the rights information corresponding to the deleted contents. The personal computer 1 causes the portable device 5-3 connected thereto via a USB cable to delete (or render unusable) the contents which the personal computer 1 has checked-out to the portable device 5-3, and updates the rights information corresponding to the deleted contents.

The personal computer 1 cannot check-in contents checked-out to the portable device 5-1 by another personal computer not shown in the drawings. The personal computer 1 cannot check-in contents checked-out to the portable device 5-2 by another personal computer. The personal computer 1 cannot check-in contents checked-out to the portable device 5-3 by another personal computer.

In response to a request from the personal computer 1, the EMD server 3 supplies contents to the personal computer along with data relating to the contents (e.g., music piece title (hereafter may be referred to simply as "title"), playing restrictions, etc.), via the network 2.

The contents which the EMD server 3 supplies are encoded by a predetermined encoding method, and encrypted with a predetermined encryption method.

In response to a request of the personal computer 1, a WWW (World Wide Web) server 4 supplies data corresponding to a CD from which contents are read (e.g., CD album title, CD record company, etc.) and data corresponding to the contents read from a CD (e.g., music piece title, name of composer (hereafter may be referred to as "artist name"), etc.), to the personal computer 1.

The portable device 5-1 stores the contents supplied from the personal computer 1 (i.e., check-out contents) along with data relating to contents (e.g., music piece title, playing restrictions, etc.). The portable device 5-1 plays the stored contents based on the data relating to the contents, and outputs the contents to an unshown headphone set or the like.

For example, in the event that a user attempts to play contents a number of times exceeding the number of playing times which is playing restrictions stored as data relating to the contents, the portable device 5-1 stops playing of the corresponding contents. In the event that a user attempts to play contents after expiration of the playing period which is playing restrictions stored as data relating to the contents, the portable device 5-1 stops playing of the corresponding contents.

The user can remove the portable device 5-1 storing the contents from the personal computer 1 carry the portable device 5-1, and further play the contents stored therein so that music or the like corresponding to the contents can be listened to through unshown headphones or the like.

The portable device 5-2 stores the contents supplied from the personal computer 1 along with data relating to contents. The portable device 5-2 plays the stored contents based on the data relating to the contents, and outputs the contents to an unshown headphone set or the like. The user can remove the portable device 5-2 storing the contents from the personal computer 1 carry the portable device 5-2, and further play the contents stored therein so that music or the like corresponding to the contents can be listened to through unshown headphones or the like.

The portable device 5-3 stores the contents supplied from the personal computer 1 along with data relating to contents. The portable device 5-3 plays the stored contents based on the data relating to the contents, and outputs the contents to an unshown headphone set or the like. The user can remove the portable device 5-3 storing the contents from the personal computer 1 carry the portable device 5-3, and further play the contents stored therein so that music or the like corresponding to the contents can be listened to through headphones or the like.

In the following description, the portable devices 5-1 through 5-3 will be referred to simply as portable device 5, unless there is the need to distinguish between the individual portable devices 5-1 through 5-3.

Figure 2:
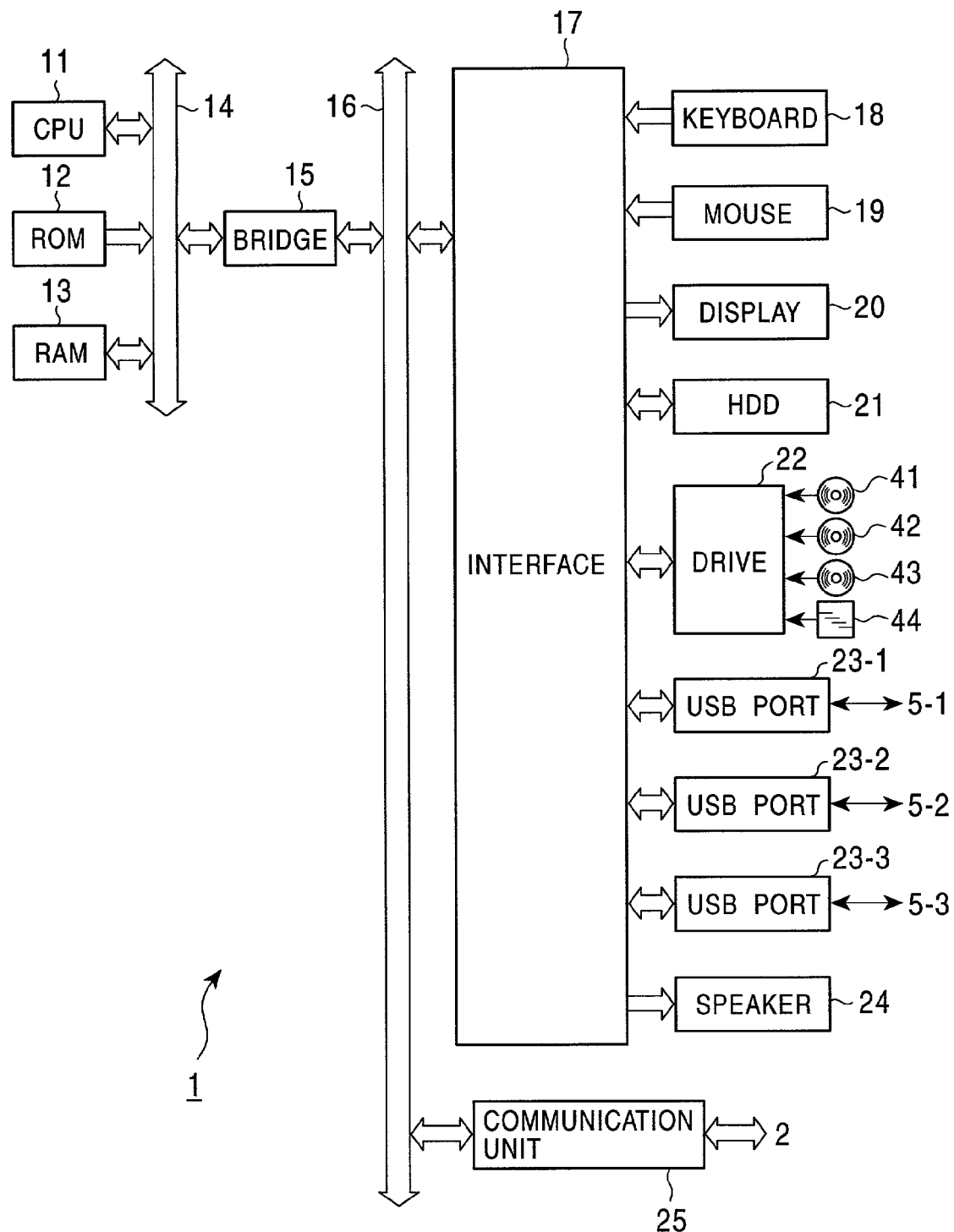
FIG. 2 is a diagram describing the configuration of the personal computer 1.

FIG. 2 is a diagram describing the configuration of the personal computer 1. A CPU (Central Processing Unit) 11 performs the actual execution of various application programs for realizing the later-described functions and the Operating System. ROM (Read-Only Memory) 12 generally stores, of the programs used by the CPU 11 and parameters used for computation, the fixed data. RAM (Random-Access Memory) 13 stores programs used for executing by the CPU 11 and parameters which change according to the execution thereof. These are mutually connected by a host bus 14 configured of a CPU bus or the like.

The host bus 14 is connected to an external bus 16 such as a PCI (Peripheral Component Interconnect/Interface) bus or the like via a bridge 15.

A keyboard 18 is operated by the user when inputting various instructions to the CPU 11. A mouse 19 is operated by the user when pointing instructions or selections on the screen shown on a display 20. The display 20 comprises a liquid crystal display device or CRT (Cathode Ray Tube) or the like, for displaying various types of information in text and images. A HDD (Hard Disk Drive) 21 drives hard disks, and records programs to be executed by the CPU 11 and information therein and reproduces the programs and information therefrom.

A drive 22 reads out data or programs recorded on magnetic disks 41, optical disks (including CDs) 42, magneto-optical disks 43, or semiconductor memory 44, which are mounted as necessary, and supplies the data or programs to RAM 13 which is connected thereto via an interface 17, the external bus 16, the bridge 15, and the host bus 14.

The portable device 5-1 is connected to the USB port 23-1 via a USB cable. The USB port 23-1 outputs to the portable device 5-1 data (e.g., contents, commands for the portable device 5-1, and so forth) supplied from the CPU 11, RAM 13, or HDD 21, to the respective removable disk devices 3-1 through 3-3, via the interface 17, external bus 16, bridge 15, or host bus 14.

The portable device 5-2 is connected to the USB port 23-2 via a USB cable. The USB port 23-2 outputs to the portable device 5-2 data (e.g., contents, commands for the portable device 5-2, and so forth) supplied from the CPU 11, RAM 13, or HDD 21, to the respective removable disk devices 3-1 through 3-3, via the interface 17, external bus 16, bridge 15, or host bus 14.

The portable device 5-3 is connected to the USB port 23-3 via a USB cable. The USB port 23-3 outputs to the portable device 5-3 data (e.g., contents, commands for the portable device 5-3, and so forth) supplied from the CPU 11, RAM 13, or HDD 21, to the respective removable disk devices 3-1 through 3-3, via the interface 17, external bus 16, bridge 15, or host bus 14.

A speaker 24 outputs predetermined audio corresponding to contents, based on audio signals supplied from the interface 17.

The keyboard 18, mouse 19, display 20, HDD 21, drive 22, USB ports 23-1 through 23-3, and speaker 24, are connected to the interface 17, and the interface 17 is connected to the CPU 11 via the external bus 16, bridge 15, and host bus 14.

A communication unit 25 has a network 2 connected thereto, for storing data supplied from the CPU 11 or HDD 21 (e.g., a request for transmitting contents) in packets of a predetermined format which are then transmitted via the network 2, and also for outputting data (e.g., contents, etc.) stored in packets received via the network 2 to the CPU 11, RAM 13, or HDD 21.

The communication unit 25 is connected to the CPU 11 via the external bus 16, bridge 15, and host bus 14.

In the following description, the USB ports 23-1 through 23-3 will be referred to simply as USB port 23, unless there is the need to distinguish between the individual USB ports 23-1 through 23-3.

Figure 3:
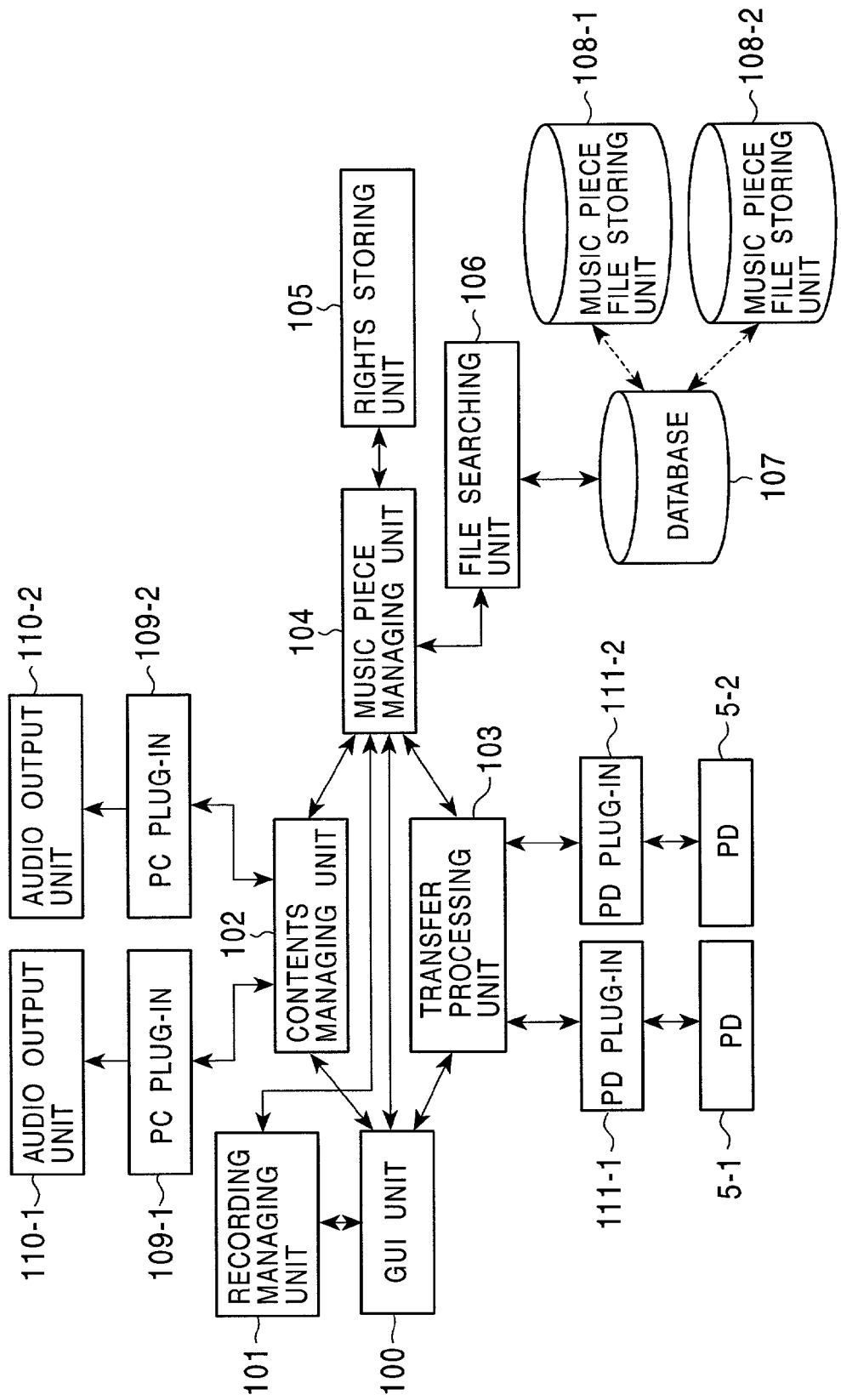
FIG. 3 is a block diagram describing the configuration of the functions of the personal computer 1 shown in FIG. 2.

FIG. 3 is a block diagram illustrating the functions of the personal computer 1 realized by the CPU 11 executing a contents managing program (application program).

A GUI (Graphical User Interface) unit 100, in response to operation of the keyboard 18 or mouse 19 by the user, supplies a music piece title corresponding to contents which the user desires or a file name of a file where the contents are stored, to a music piece managing unit 104, and also requests registration of data corresponding to the contents, to a database 107.

The GUI unit 100 obtains data relating to the contents, e.g., data such as music piece ID, music piece title, or artist name, from the music piece managing unit 104, and displays the music piece ID, music piece title, artist name, etc., on the display 20.

In the event that user operations request playing of contents, the GUI unit 100 supplies the music piece ID corresponding to the contents regarding which playing has been requested to a contents managing processing unit 102, and also requests playing of the contents to the contents managing processing unit 102.

In the event that user operations request transfer (check-out, copying, moving, etc.) of contents, the GUI unit 100 supplies the music piece ID corresponding to the contents regarding which transfer has been requested to the transfer processing unit 103, and also requests transfer of the contents to the transfer processing unit 103.

In the event that user operations request audio recording of contents (processing wherein contents recorded on a CD (corresponding to the optical disk 42) mounted on the drive 22 are stored in the music piece file storing units 108-1 and 108-2

(corresponding to the HDD 21), the GUI unit 100 supplies to the audio recording managing unit 101 the music piece ID corresponding to the contents regarding which audio recording has been requested, and also requests an audio recording managing unit 101 to perform audio recording of the contents. Also, the GUI unit 100 displays a play list on the display 20, containing a list of the music piece IDs and file names of the contents corresponding to the play list ID.

The audio recording managing unit 101 executes audio recording processing in the event that audio recording of the contents is requested from the GUI unit 100. At the point that a CD to be recorded is mounted in the drive 22, the audio recording managing unit 101 reads out the TOC (table of Contents) therein, and generates media-specific identification information from the number of contents contained therein, the audio recording time, and other such information.

Also, at the time of performing audio recording to contents from a CD or the like to the music piece file storing unit 108, the audio recording managing unit 101 generates or updates (in the event that audio recording history information has already been generated) audio recording history information which indicates the number of times that each of the tracks of the CD has been recorded as audio, and stores the audio recording history information in internal memory. Also, in the event that the same CD is mounted to the drive 22 again, the audio recording managing unit 101 reads out the audio recording history information, outputs the number of times of audio recording for each of the tracks of the CD to the GUI unit 100, to be displayed on the display 20. Also, in the event of performing audio recording processing for a CD the first time, the audio recording managing unit 101 accesses a WWW server 4 or the like via the communication unit 25 and the network 2, downloads title information for the contents, and stores the downloaded title information of the contents and the media specific identification information as title saving information in internal memory. Also, the audio recording managing unit 101 generates a play list ID serving as an index for indexing multiple contents recorded by one audio recording processing, outputs this to the music price managing unit 104 along with the contents, and records this in the music piece file storing unit 108. The title saving information will be described later with reference to FIG. 4. Also, the audio recording managing unit 101 can further perform audio recording of contents distributed from an EMD server 3, via the network 2 and the communication unit 25.

Upon a request from the GUI unit 100 to play contents, the contents managing processing unit 102 supplies to the music piece managing unit 104 a music piece ID corresponding to the contents regarding which playing has been requested, or a music piece ID corresponding to the contents contained in the play list regarding which playing has been requested (i.e., the music piece ID of contents recorded along with the play list ID corresponding to the play list regarding which playing has been requested), and also request a file name corresponding to the contents. Upon obtaining the file name of the music piece managing unit 104, the contents managing processing unit 102 obtains the contents from the music piece file storing unit 108-1 or 108-2, via the music piece managing unit 104, file searching unit 106, and database 107.

The contents managing processing unit 102 supplies the obtained contents to a PC (Protected Content) plug-in 109-1 or 109-2.

Upon the contents being supplied from the contents managing processing unit 102, in the event that the contents are not encrypted, the PC plug-in 109-1 decodes the encoded contents, and supplies the audio data to an audio output unit 110-1. Upon the contents being supplied from the contents managing processing unit 102, in the event that the contents are encrypted, the PC plug-in 109-1 decrypts the encrypted contents, as well as decoding the encoded contents, and supplies the audio data to the audio output unit 110-1. The audio output unit 110-1 generates audio signals based on the audio data, and outputs audio from the speaker 24.

At the time that contents are supplied from the contents managing processing unit 102, in the event that the contents are not encrypted, the PC plug-in 109-2 decodes the encoded contents, and supplies the audio data to an audio output unit 110-2. Upon the contents being supplied from the contents managing processing unit 102, in the event that the contents are encrypted, the PC plug-in 109-2 decrypts the encrypted contents, as well as decoding the encoded contents, and supplies the audio data to the audio output unit 110-2. The audio output unit 110-2 generates audio signals based on the audio data, and outputs audio from the speaker 24.

The user can further additionally install PC plug-ins.

In the following description, the PC plug-ins 109-1 and 109-2 will be referred to simply as PC plug-in 109, unless there is the need to distinguish between the individual PC plug-ins 109-1 and 109-2.

Upon a contents transfer request from the GUI unit 100, the transfer processing unit 103 supplies the music piece managing unit 104 with the music piece ID corresponding to the contents regarding which transfer has been requested, as well as requesting the file name corresponding to the contents. The transfer processing unit 103, upon obtaining the file name from the music piece managing unit 104, obtains contents corresponding to the file name from the music piece file storing unit 108-1 or 108-2 via the music piece managing unit 104, file searching unit 106, and database 107.

The transfer processing unit 103 supplies the obtained contents to the PD plug-in 111-1 or 111-2.

At the time of transferring contents to the portable device 5-1, the PD plug-in 111-1 performs mutual verification with the portable device 5-1. In the event that the mutual verification fails, the PD plug-in 111-1 does not transfer contents to the portable device 5-1.

At the time that contents are supplied from the transfer processing unit 103, in the event that the contents are encrypted, the PD plug-in 111-1 supplies the contents along with the data relating to the contents to the portable device 5-1. Upon the contents being supplied from the transfer processing unit 103, in the event that the contents are not encrypted, the PD plug-in 111-1 encrypts the contents, and supplies the encrypted contents along with the data relating to the contents to the portable device 5-1. Incidentally, the processing for mutual verification may be executed at the point that the portable device 5-1 is connected to the personal computer 1.

At the time of transferring contents to the portable device 5-2, the PD plug-in 111-2 performs mutual verification with the portable device 5-2. In the event that the mutual verification fails, the PD plug-in 111-2 does not transfer contents to the portable device 5-2.

At the time that contents are supplied from the transfer processing unit 103, in the event that the contents are encrypted, the PD plug-in 111-2 supplies the contents along with the data relating to the contents to the portable device 5-2. Upon the contents being supplied from the transfer processing unit 103, in the event that the contents are not encrypted, the PD plug-in 111-2 encrypts the contents, and supplies the encrypted contents along with the data relating to the contents to the portable device 5-2. Incidentally, the processing for mutual verification may be executed at the point that the portable device 5-2 is connected to the personal computer 1.

The user can further additionally install PD plug-ins.

In the following description, the PD plug-ins 111-1 and 111-2 will be referred to simply as PD plug-in 111, unless there is the need to distinguish between the individual PD plug-ins 111-1 or 111-2.

The music piece managing unit 104 records data in the database 107, such as the music piece title corresponding to the contents, or file name, media-specific identification information corresponding to the contents, and play list ID, etc., and reads out the music piece title, file name, etc., from the database 107. Upon receiving the music piece title or file name from the GUI unit 100, the music piece managing unit 104 adds a record to the database 107, and records the music piece title or file name as a record item, and further adds media-specific identification information, and the play list ID as well.

In response to a request from the GUI unit 100, the music piece managing unit 104 reads out all music piece titles and music piece IDS or the like recorded in the database 107 and supplies these to the GUI unit 100. Also, upon being supplied with the media-specific identification information from the audio recording managing unit 101, the music piece managing unit 104 reads out the file names and music piece IDs corresponding to the media-specific identification information from the database 107 and supplies these to the GUI unit 100. Further, upon being supplied with a play list ID from the audio recording managing unit 101, the music piece managing unit 104 supplies the music file names and music piece IDs corresponding to the play list ID to the GUI unit 100.

Upon the music piece ID being supplied from the contents managing processing unit 102, the music piece managing unit 104 reads the file name corresponding to the music piece ID from the database 107, and supplies the file name that has been read out to the contents managing processing unit 102. Upon the music piece ID being supplied from the transfer processing unit 103, the music piece managing unit 104 reads out the file name corresponding to the music piece ID from the database 107, and supplies the file name that has been read out to the transfer processing unit 103.

In response to a request from the music piece managing unit 104, the file searching unit 106 searches for a file corresponding to the file name from the music piece file storing unit 108-1 or 108-2, based on the file name obtained from the database 107. The file searching unit 106 either A supplies the file read out from the music piece file storing unit 108-1 or 108-2 to the music piece managing unit 104, or changes the file name of the file and supplies the file with the changed file name to the music piece managing unit 104.

The music piece managing unit 104 supplies the file storing the contents supplied from the file searching unit 106 to the contents managing processing unit 102 or the transfer processing unit 103.

The database 107 records data relating to the contents, such as, for example, the music piece ID, music piece title, file name, media-specific identification information, play list ID, and other attributes. The database 107 is stored in the HDD 21.

Next, title saving information stored by the audio recording managing unit 101 in the internal memory thereof will be described with reference to FIG. 4. Title saving information is information recorded in the internal memory of the audio recording managing unit 101, containing information such as the media-specific identification information of the audio-recorded CD, album title of the CD, title of each of the contents, artist name, and URL (Universal Resource Locator) of the server providing information for the contents. Also, the title saving information is read out by the GUI unit 100, and also has information serving as display data for executing audio recording processing and the like.

In this case, Line 1 in FIG. 4 is shown as "DISCID=5544332" showing that media-specific identification information is recorded. The media-specific identification information is a value obtained by the number of the contents recorded in the TOC of every CD (i.e., the number of music pieces) and the total recording time and so forth ("554433221" in this case), with CDs being identified by this media-specific identification information.

Line 2 shows "DTITLE=KING/RIDING", indicating that "KING/RIDING" has been registered as the title of this CD. Line 3 through Line 10 show "TTITLE0=RIDING", "TTITLE1=TEN LONG", "TTITLE2=KEY", "TTITLE3=MARY", "TTITLE4=THREE", "TTITLE5=HELP", "TTITLE6=I", AND "TTITLE7=WORRIED", thus recording the titles of the contents recorded therein by track. In this case, this indicates that the title of the contents corresponding to track No. 0 (the contents of the first piece) is "RIDING", that the title of the contents corresponding to track No. 1 (the contents of the second piece) is "TEN LONG", and that the titles of the contents of the third piece on are "KEY", "MARY", "THREE", "HELP", "I", and "WORRIED".Note that in this case, the titles for the track Nos. 8 and 9 in Line 11 and Line 12 are blank.

Line 13 shows "EXTD=ARTIST:KING", indicating that the name of the artist is "KING". Lines 14 and 15 show "EXTD=URL1:ARTIST DISCOGRAPHY http://www.cdnew.co.jp/artist.asp.artistID=1122" and "EXTD=URL2:CDNEW JAPAN HOME http:www.cdnew.co.jp/index.asp", each recording information of the WWW server 4 from which the information in the above Line 1 through Line 13 has been obtained. "ARTIST DISCOGRAPHY" and "CDNEW JAPAN HOME" are names of the WWW server 4, and the following "http://www.cdnew.co.jp/artist.asp.artistID=1122" and "http:www.cdnew.co.jp/index.asp" are the URLs thereof.

Figure 5:
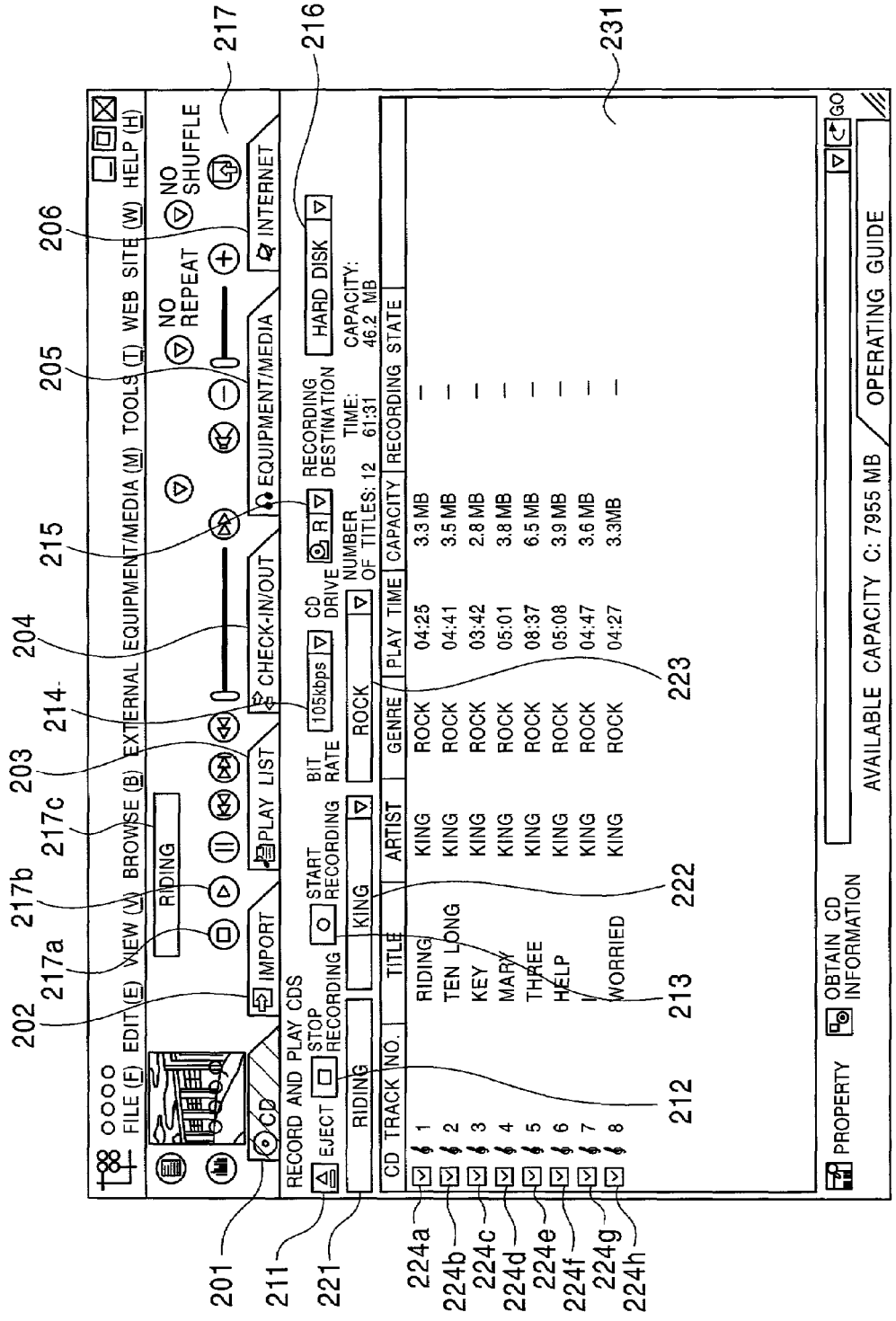
FIG. 5 is a diagram illustrating a display example of a window in the event that a CD tab is active.

Next, with reference to FIG. 5, description will be made regarding a display example of a window displayed by the GUI unit 100 on the display 20, based on commands of the audio recording managing unit 101 from the contents managing program (application program), in the event that a CD (corresponding to the optical disk 42 in FIG. 2). In the window are a CD tab 201, an import tab 202, a play list tab 203, a check-in/out tab 204, an equipment/media tab 205, and an internet tab 206. Clicking on these for activation displays the respective display screen in the field 231. In this case, the CD tab 201 is in an active state, and information relating to the CD is displayed in the field 231.

An eject button 211 is displayed below the CD tab 201, and clicking this ejects the CD mounted on the drive 22. A recording stop button 212 and a recording start button 231 are displayed to the right side of the eject button 211, and clicking on the recording start button 213 starts audio recording of the CD contents specified in the field 231 to the HDD 21, while clicking the recording stop button 212 during audio recording stops the audio recording processing.

A bit-rate display space 214 is displayed to the right side of the audio recording start button 213, and clicking this displays a drop-down list of various bit-rates, thereby allowing the bit-rate to be used for audio recording with a pointer. A drive display space 215 indicating the drive to which the CD to be recorded has been mounted is displayed to the right side of the bit-rate display space 214, and clicking this displays a drop-down list of selectable drive names, which can be selected with the pointer. Further, to the right of the drive display space 215 is displayed an audio recording destination display space 216, and clicking this displays a drop-down list of audio recording destinations such as the HDD 21 and portable devices 5-1 through 5-3, etc., which can be selected with the pointer.

A task bar 217 is displayed above the tabs. The task bar 217 has displayed thereupon a stop button 217a, a play button 217b, and other operating buttons, whereby various types of operation such as playing and stopping of contents, specified in the field 231, can be carried out. Also, an album title display space 217c is displayed above the stop button 217a, and in this case, "RIDING" is displayed as the album title.

An album title display space 221 is displayed below the eject button 211, where the album title of the inserted CD is displayed. In this case, "RIDING" is displayed as the album title. Displayed to the right side of the album title display space 221 is an artist name display space 222, and in this case, "KING" is displayed as the artist name. To the right of the artist name display space 222 is displayed a genre display space 223, and in this case, "ROCK" is displayed in the claims.

The contents of the inserted CD are shown in the field 231, in CD track order from the top. For each of the contents, the CD track No., title, artist, genre, play time, capacity, and recording state are displayed. In the space where the CD track No. is displayed, in addition to the CD track No. are displayed, from the left, check boxes 224a through 224h, and symbols indicating that the contents are playable (in this case, a treble clef is displayed). A check mark appears when the check boxes 224a through 224h are clicked, and clicking again removes the check mark. The contents regarding which the check boxes 224a through 224h have been checked (those displaying a check mark) are the object of audio recording from the CD. In this case, all of the check boxes 224a through 224h are checked, so in the event that the audio recording start button 213 is clicked in this state, audio recording of all of the contents from the CD to the HDD 21 will be executed. Also, the treble clef symbol indicates that the corresponding contents are in a currently playable state, and the display changes to, for example, a rest mark (see FIG. 9) in the event that the contents are not playable.

Next, with reference to the flowchart in FIG. 6, the processing of mounting the CD at the time of recording the contents of the CD with the personal computer 1 will be described. Upon the CD being mounted to the drive 22, in step S1, the audio recording managing unit 101 judges whether or not the mounted CD is an audio CD (i.e., a CD wherein music contents are recorded thereupon), and in the event that judgment is made that the CD is an audio CD, the processing proceeds to step S2.

In step S2, the audio recording managing unit 101 reads in the TOC (Table of Contents) information recorded in the CD, and generates media-specific identification information from the number of contents and the total recording time and so forth of the CD.

In step S3, the audio recording managing unit 101 sends the media-specific identification information to the music piece managing unit 104, and makes an inquiry regarding whether or not a play list ID corresponding to the same media-specific identification information registered previously exists or not. In the event that the same media specific identification information does not exist, and judgment is made that a corresponding play list ID does not exist, the processing proceeds to step S4.

In step S4, the audio recording managing unit 101 searches audio recording history information existing in memory built into itself, and judges whether or not audio recording history of each of the tracks of the mounted CD exist therein. In step S5, in the event that judgment is made that audio recording history information of the tracks of the CD exists therein, the audio recording managing unit 101 tabulates the number of times of audio recording of the contents from the searched audio recording history information, and displays this on the display 20. At this time, "recorded" is displayed in the audio recording state display space on the field 231, for example (see FIG. 9). Further, in the event that the history of recording shows that the track has been recorded two times, for example, "2" is displayed to the right of the "recorded" number of times history in the recording state display space as the number of times history (see FIG. 11).

In step S6, the audio recording managing unit 101 causes the GUI unit 100 to check the check boxes of unrecorded track an make a display thereof. For example, in the event that none of the contents are in a recorded state, the check boxes 224a through 224h for all of the tracks are checked, as shown in FIG. 5.

In step S7, the recording managing unit 101 searches the title saving information stored in the built-in memory, based on the generated media-specific identification information. In step S8, the audio recording managing unit 101 judges whether or not title saving information containing the generated media-specific identification information exists in the built-in memory thereof, and in the event that judgment is made that this information exists therein, the flow proceeds to step S9.

In step S9, the audio recording managing unit 101 obtains information of the titles of each of the contents, saved in the searched title saving information, which is output to the GUI unit 100 and displayed on the display 20. For example, once the title saving information shown in FIG. 4 is obtained, the title and artist name, of each of the contents are displayed on the field 231, as shown in FIG. 5.

In step S10, the audio recording managing unit 101 en; registers the album title as a new play list, and transfers this along with the corresponding play list ID to the music piece managing unit 104, where it is stored. For example, in a case such as shown in FIG. 5, "RIDING" is registered as a play list.

In step S11, the audio recording managing unit 101 judges whether or not the audio recording start button 213 has been clicked, and in the event that judgment is made that it has been clicked, in step S12 the audio recording managing unit 101 executes audio recording processing.

Figure 7:
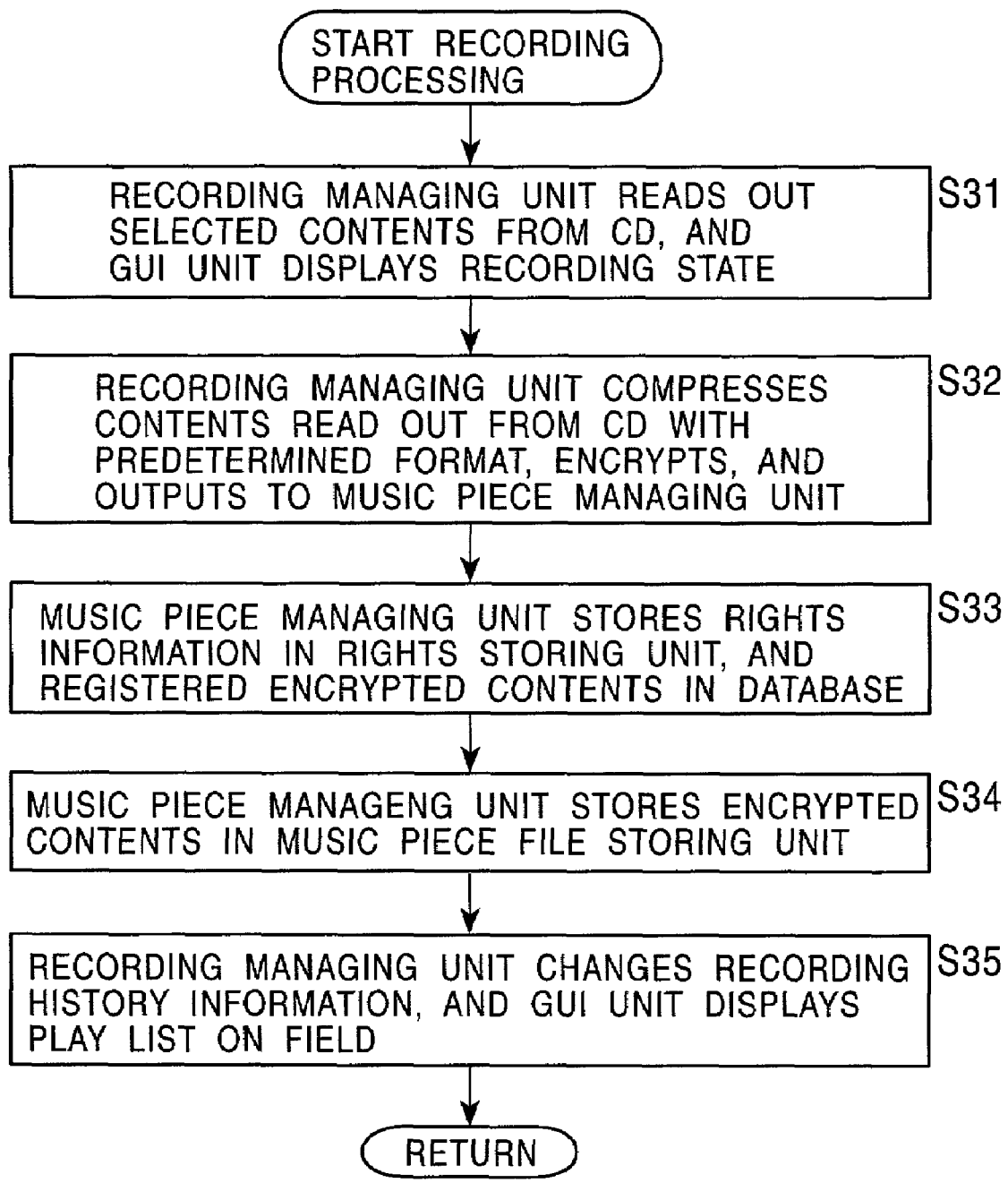
FIG. 7 is a flowchart describing audio recording processing.
Figure 8:
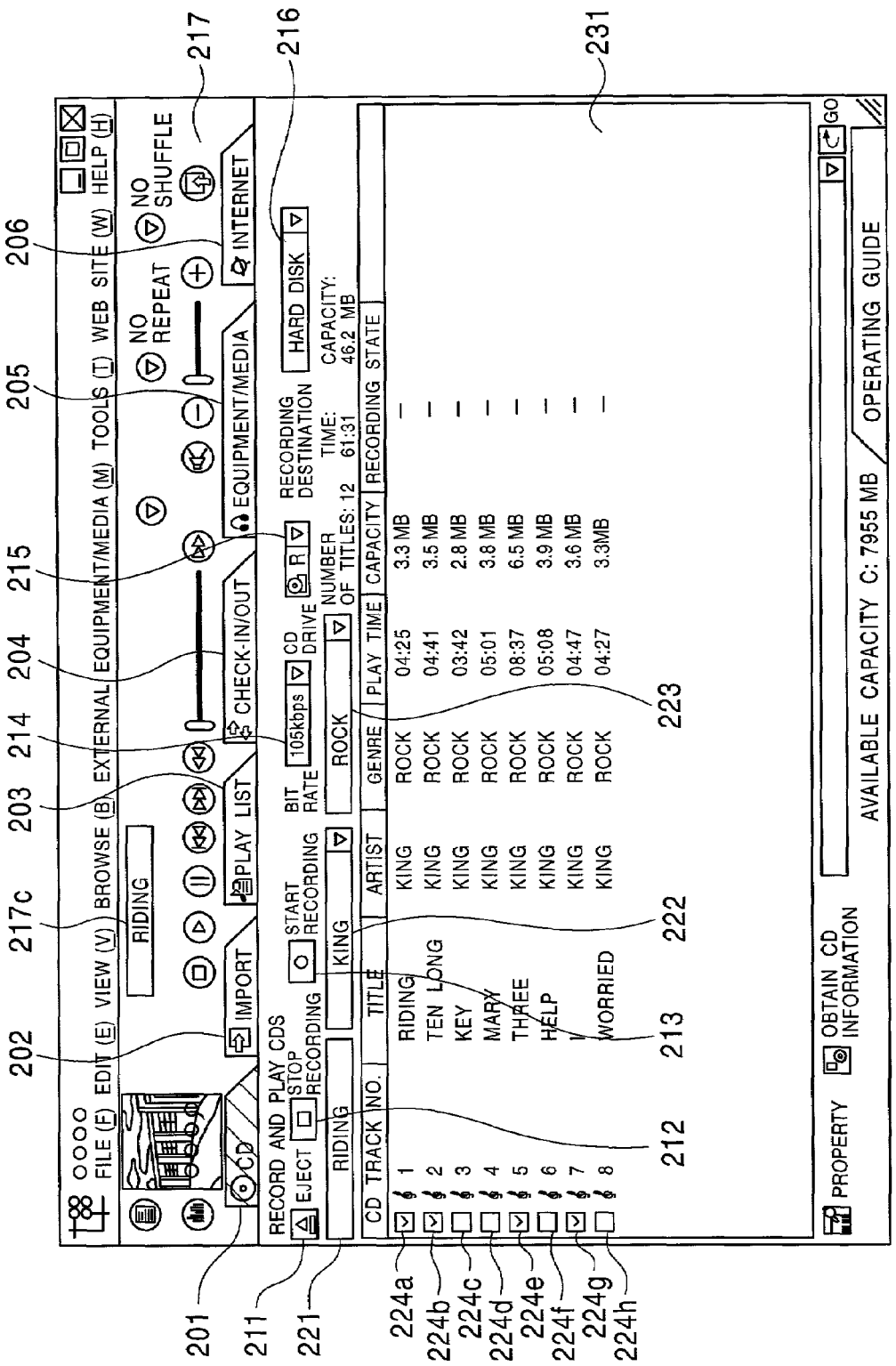
FIG. 8 is a diagram illustrating a display example of a window in the event that the CD tab is active.

Now, the audio recording processing will be described with reference to FIG. 7. In step S31, the audio recording managing unit 101 makes inquiry to the GUI unit 100, and reads out the selected contents from the CD. For example, as shown in FIG. 8, in the event that the check boxes 224a, 224b, 224e, and 224g are checked and the audio recording start button 213 has been clicked, the contents of the track Nos. 1, 2, 5, and 7 are read out from the CD.

In step S32, the audio recording managing unit 101 compresses the contents read out from the CD according to a predetermined format, encrypts, and outputs these to the music piece managing unit 104. In step S33, the music piece managing unit 104 stores rights information in a rights storing unit 105, and registers the encrypted contents in the database 107.

In step S34, the music piece managing unit 104 stores the encrypted contents in the music piece file storing unit 108.

Figure 9:
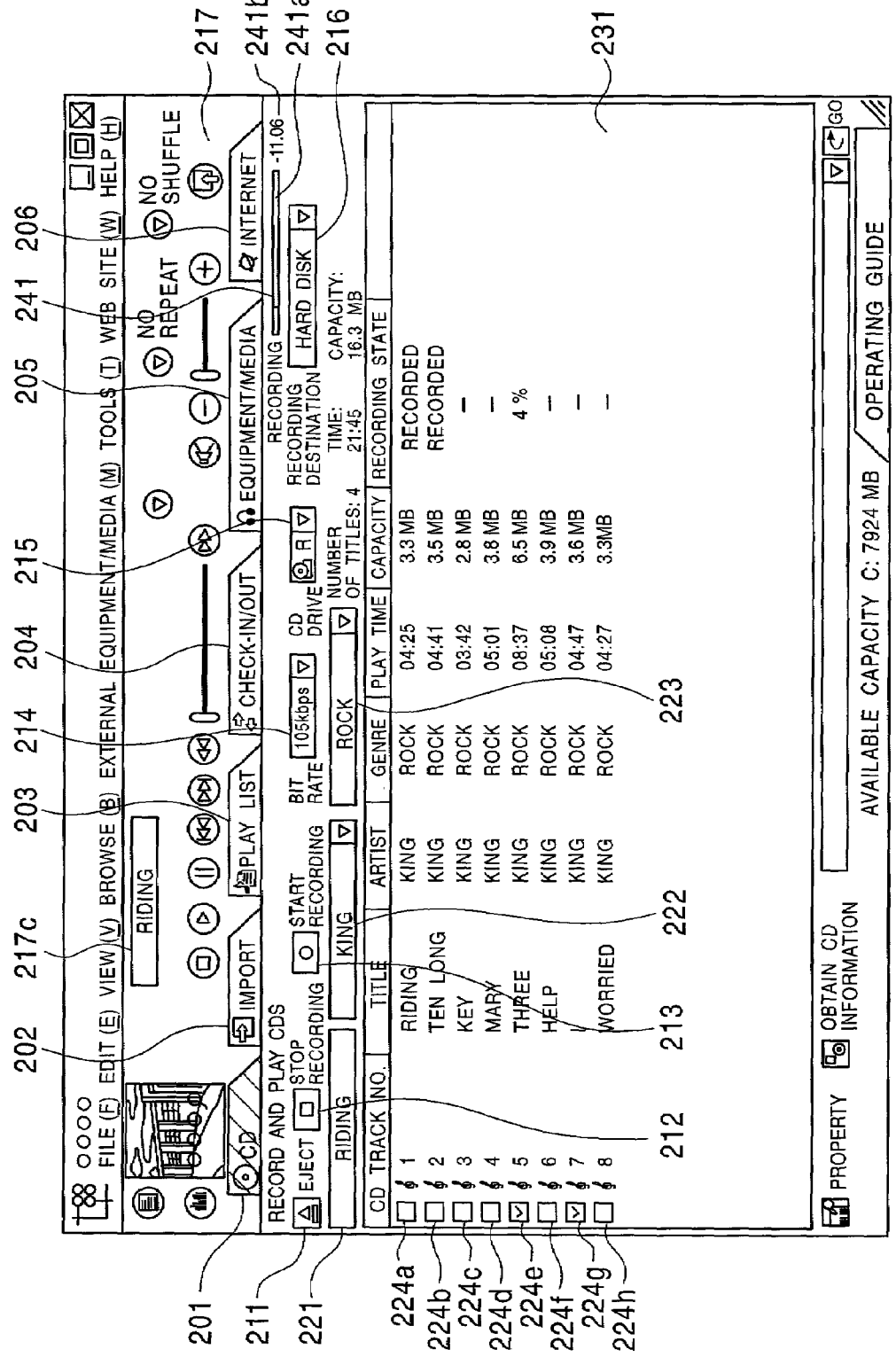
FIG. 9 is a diagram illustrating a display example of a window in the event that the CD tab is active.

While the processing of the steps S31 through 34 is going on, the GUI unit 100 displays an audio recording state display space 241 in the window as shown in FIG. 9, and displays an audio recording state display bar 241a and remaining time display space 241b therein. The audio recording state display bar 241a indicates the entire time necessary for all selected contents to be recorded, and as the processing proceeds, a bar of a predetermined color indicating the percentage completed is displayed from the left side in the figure. At the point that all processing is finally completed, the bar of the predetermined color is displayed over the entirety of the audio recording state display bar 241a. Also, "recorded" is displayed in the recording state display space for the contents regarding which recording has been completed, for example the contents of the track Nos. 1 and 2 in FIG. 9, and for contents currently undergoing audio recording, the progress of the audio recording thereof is displayed with 100% being the entirety thereof. In this case, "4%" is displayed in the audio recording state display space for the contents of track No. 5, indicating that 4% of the entire amount of the contents of track No. 5 is completed.

Figure 10:
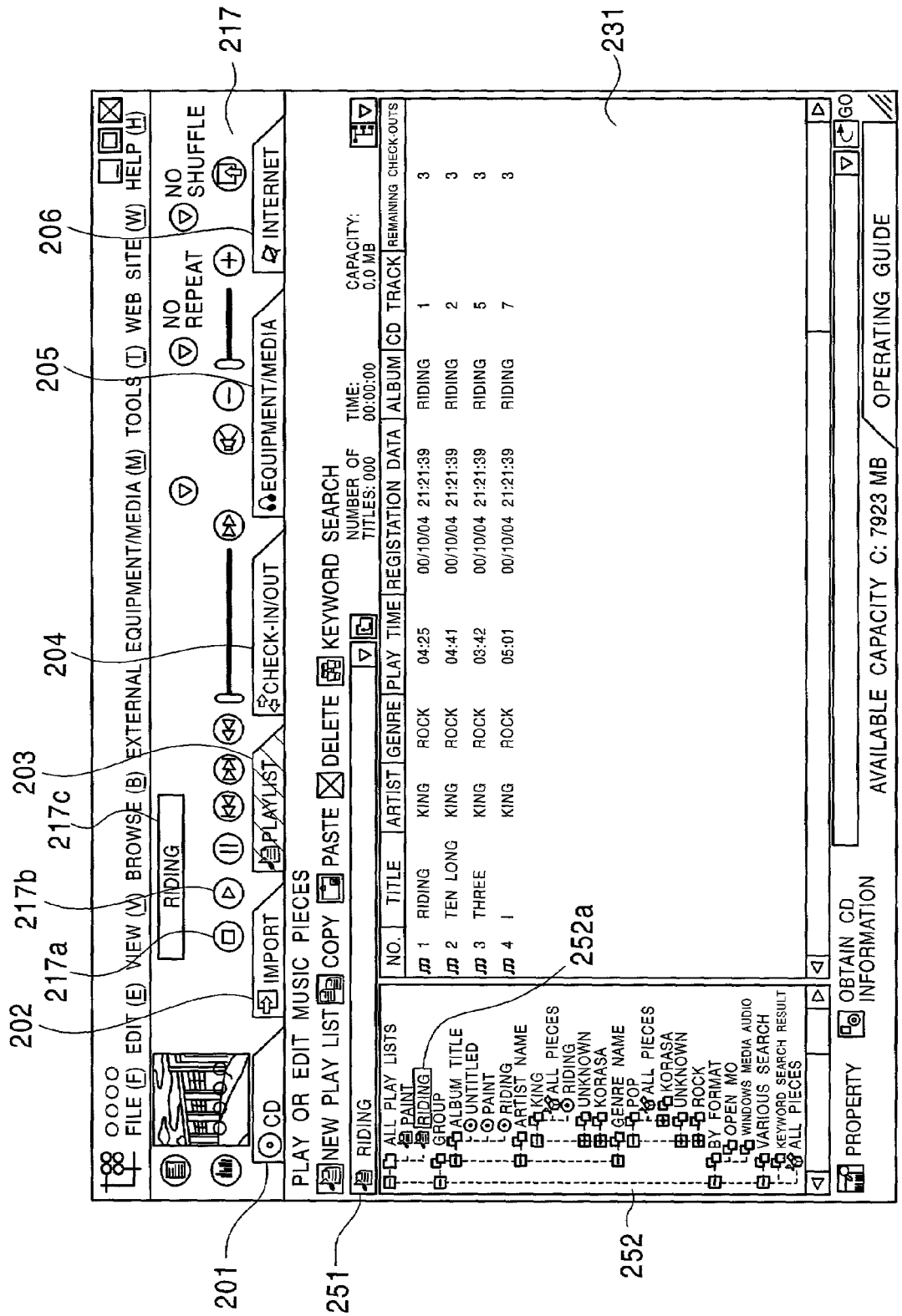
FIG. 10 is a diagram illustrating a display example of a window in the event that a play list tab is active.

In step S35, the audio recording managing unit 101 updates the audio recording history information recording the number of times of audio recording for each track. Also, as shown in FIG. 10, the GUI unit 100 displays a play list wherein the play list tab 203 is active on the display 20, as shown in FIG. 10. In the play list window shown in FIG. 10, a list of audio-recorded contents is displayed in the field 231. Also, a field 252 is displayed at the left side of the field 231. In this case, "RIDING" is displayed in the play list 251.

Also, the field 252 displays multiple play lists in tree fashion. That is, at the top level of the field 252 there are displayed the two play lists "PAINT" and "RIDING" as branches of the space displayed as "ALL PLAY LISTS". In this case, "RIDING" is active in the field 252, so the contents displayed in the field 231 are those contained in the play list for "RIDING".

Also, branches for classifying the contents by "album title", "artist name", and "genre" are provided under "ALL PLAY LISTS".

Figure 6:
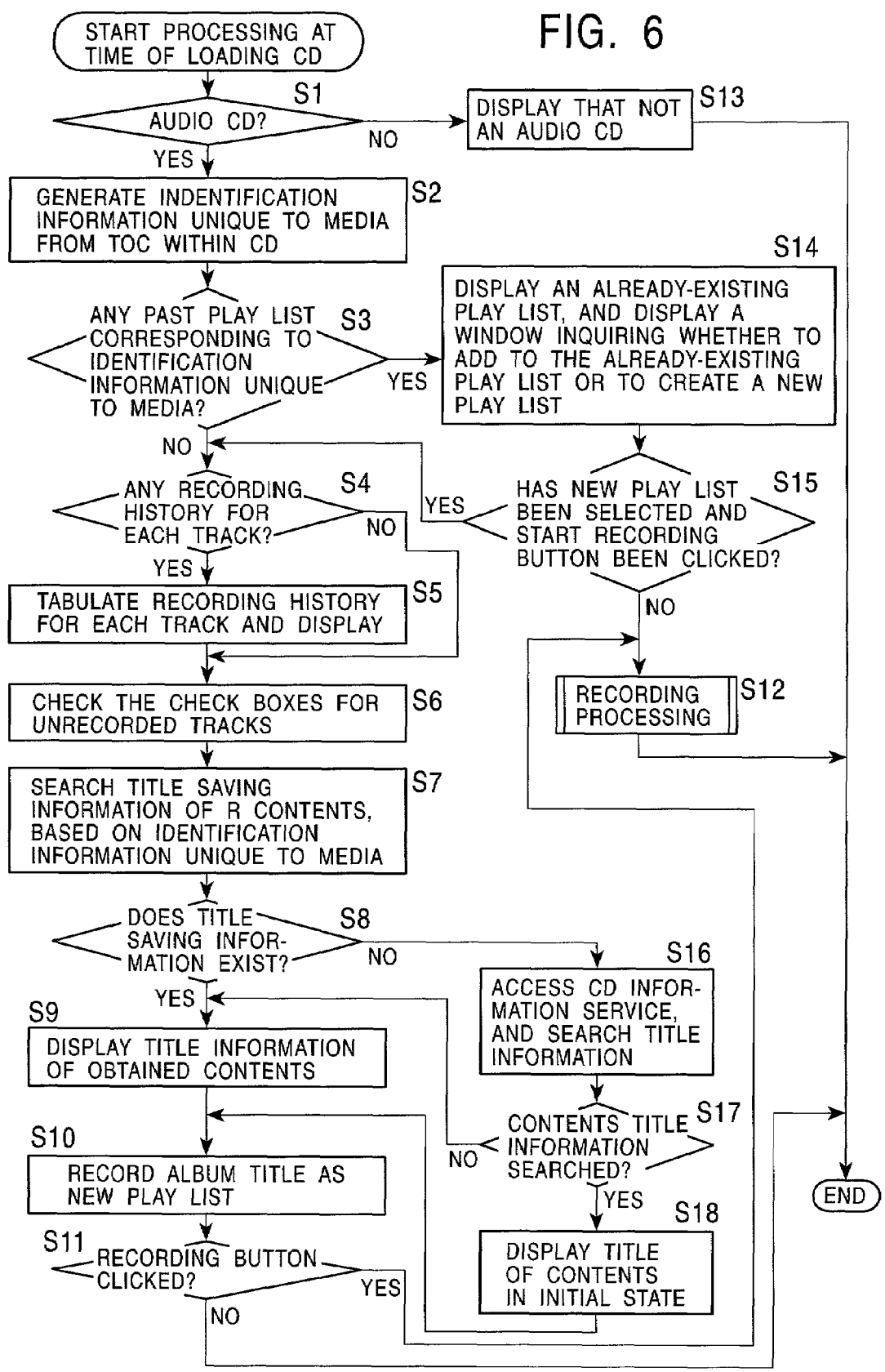
FIG. 6 is a flowchart for describing the processing at the time of mounting a CD.

Now, let us return to the description of the flowchart shown in FIG. 6.

In the event that judgment is made in step S1 that the CD is not an audio CD, in step S13 the audio recording managing unit 101 causes the GUI unit 100 to make a display on the display 20 to the effect that a CD other than an audio CD is mounted on the display 20.

Figure 11:
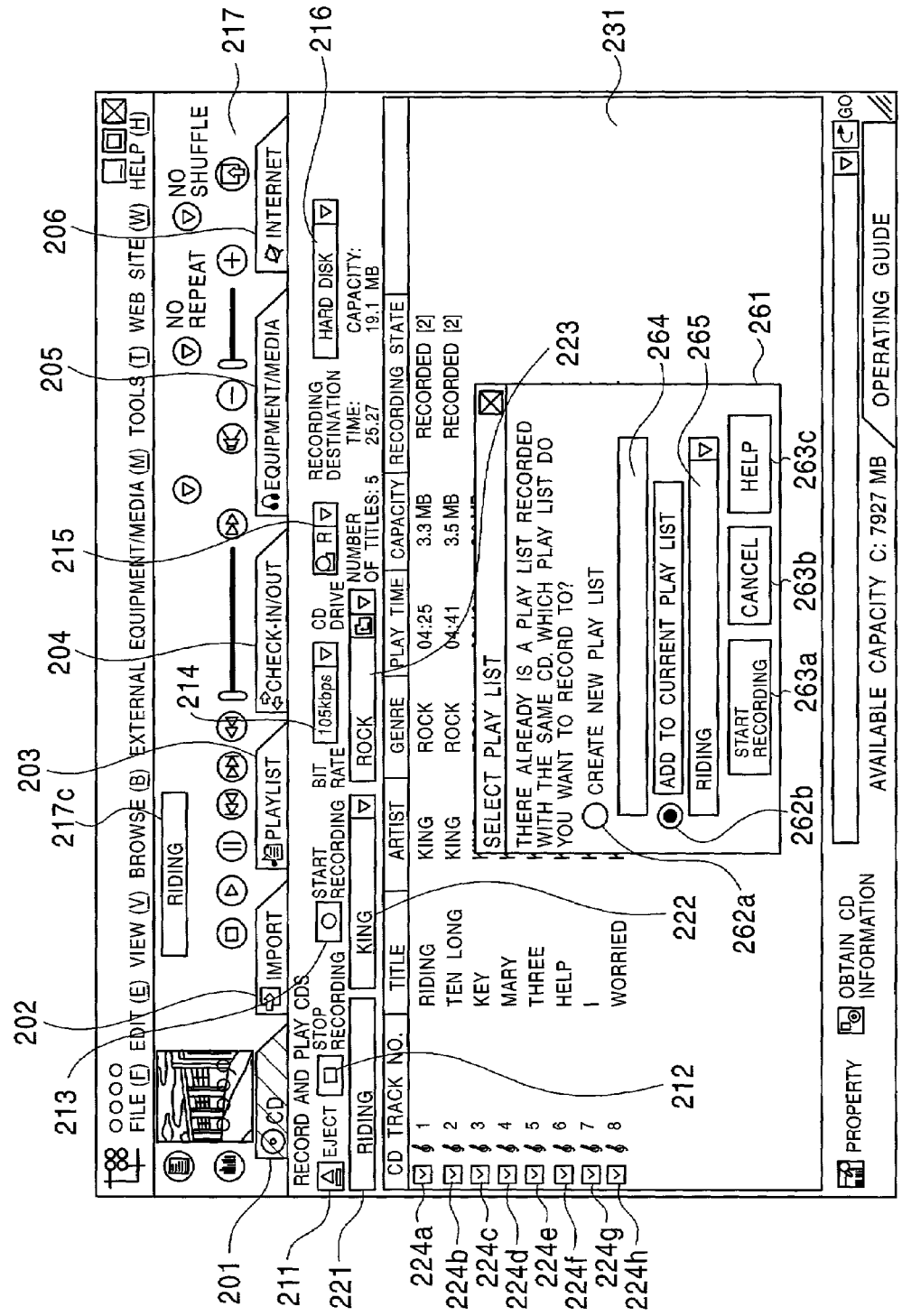
FIG. 11 is a diagram illustrating a display example of a dialog box for selecting a play list, displayed in the window in the event that the CD tab is active.

In the event that judgment is made in step S3 that a play list ID corresponding to the media-specific identification information has been searched, in step S14 the GUI unit 100 displays the contents contained in the play list corresponding to the searched play list ID in the window wherein the CD tab 201 is active as shown in FIG. 11, and further a dialog box 261 indicating selection of a play list is displayed, and a window is displayed inquiring whether to add the audio recording of the CD to an already existing play list, or to generate a new play list.

At this time, as shown in FIG. 11, a button 262a which is clicked in the event of selecting a new play list, and a button 262b selected in the event of adding to an already existing play list, are displayed in the dialog box 261. In the event that the button 262a is clicked, the button 262a is selected (a dark circle is displayed in the button), and the name of a new play list can be input in the field 264. In the event that the button 262b is clicked, the button 262b is selected (as with the present case), and play lists registered in the field 265 are displayed. Note that the play lists in the field 265 can be newly overwritten and registered.

An audio recording start button 263a is displayed under the field 265, and clicking this starts audio recording. A cancel button 263b is displayed to the right side of the audio recording start button 263a, which cancels processing in the event that it is clicked. A help button 263c is displayed to the right of the cancel button 263b, which brings up a help screen in the event that it is clicked.

Now, let us return to the description of the flowchart shown in FIG. 6.

In step S15, the audio recording managing unit 101 judges whether or not a new play list has been selected and the audio recording start button 263a has been clicked, and in the event that the button 262a has been clicked so that a new play list is selected and the audio recording start button 263a has been clicked, the processing proceeds to step S4, and the subsequent processing is repeated.

In step S15, in the event that judgment is made that a new play list has not been selected and the audio recording start button 263a has been clicked, i.e., in the event that the button 262b is clicked and the audio recording start button 263a has been clicked in the state of an already-existing play list being selected, the processing proceeds to step S12, and the above-described audio recording processing is executed.

In step S4, in the event that judgment is made that no audio recording history information exists for the tracks, the tabulating processing of the audio recording history information in step S5 is skipped, and the flow proceeds to step S6.

In the event that judgment is made in step S8 that no title saving information exists, in step S16 the audio recording managing unit 101 accesses the WWW server 4 via the communication unit 25 and network 2, and searches for title information of the contents contained in the CD inserted into the drive 22.

Figure 12:
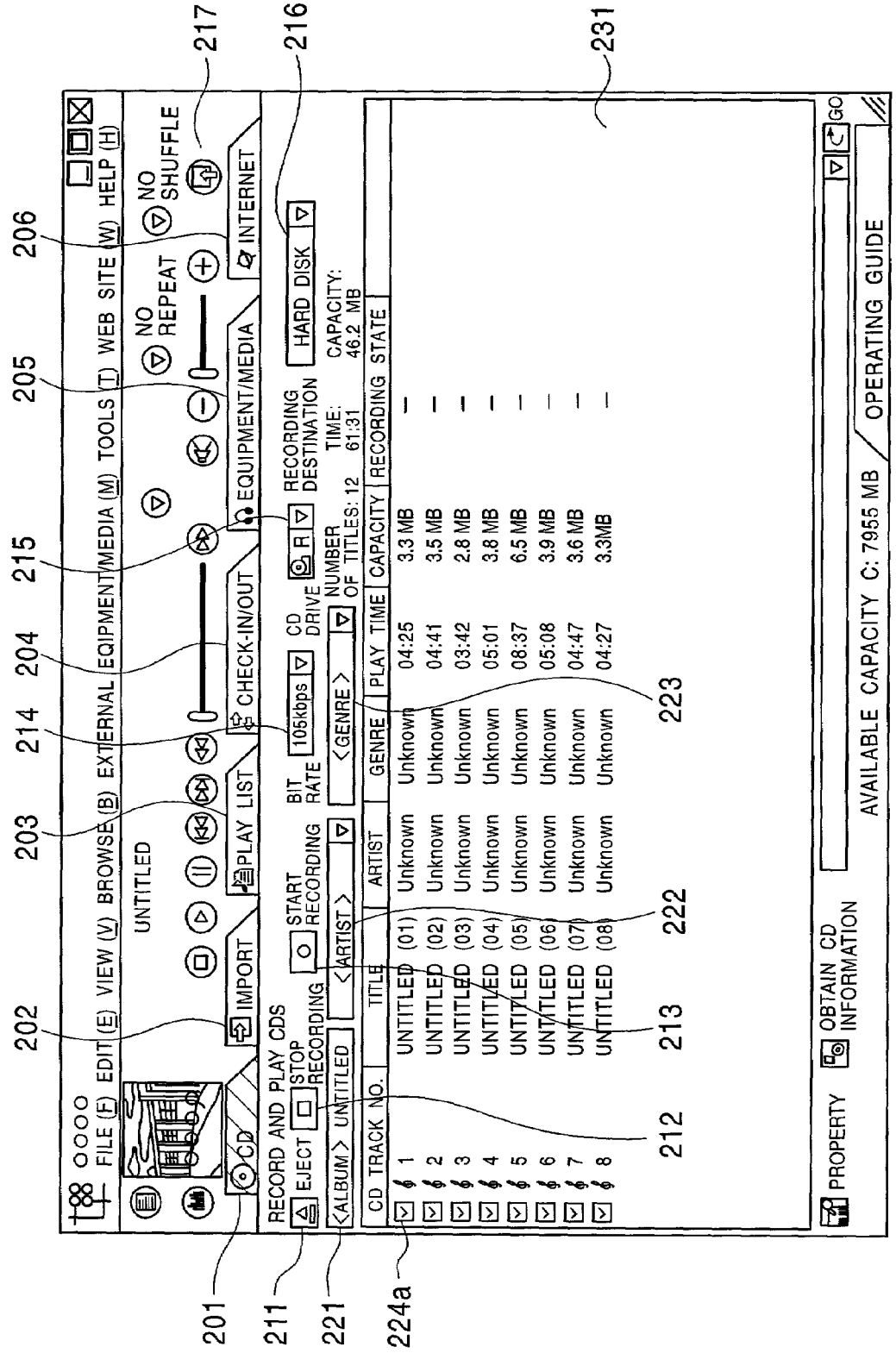
FIG. 12 is a diagram illustrating a display example of a window in the event that the CD tab is active.

In step S17, the audio recording managing unit 101 judges whether or not title information has been searched, and in the event that judgment is made that title information has been searched, the processing thereof proceeds to step S9, and the subsequent processing is repeated. In step S17, in the event that judgment is made that title information has not been searched, in step S18 the GUI unit 100 displays "untitled" in the space for the title name for the contents displayed in the field 231 as shown in FIG. 12, and "Unknown" is displayed in the spaces for the artist name and the genre. At this time, the user can input the title artist name, and genre, as necessary.

Due to the above processing, at the point that a CD regarding which the user is going to record is mounted to the drive 22, in the event that the CD has been recorded in the past, information such as the number of times of audio recording of the contents and the bit-rate is displayed even if the user does not take into consideration whether or not the CD has been recorded in the past, so erroneously making multiple audio recordings of the same contents can be avoided, thereby preventing wasting the capacity of the HDD 21. Also, in the event of recording the same contents with different bit-rates, mounting the CD for audio recording in the drive 22 causes information of contents recorded in the past to be searched and displayed, so the user can specify only the bit-rate of the contents to be recorded anew, without executing any searching processing.

Further, contents information is searched and displayed in increments of play lists of audio recordings made in the past, so in the event that there are contents of the multiple contents registered in the play list regarding which audio recording could not be completed and the audio recording thereof was discontinued for example, the unrecorded contents can be consecutively recorded simply by mounting the same CD in the drive 22, and searching for or editing a new title can be omitted at this time.

Figure 13:
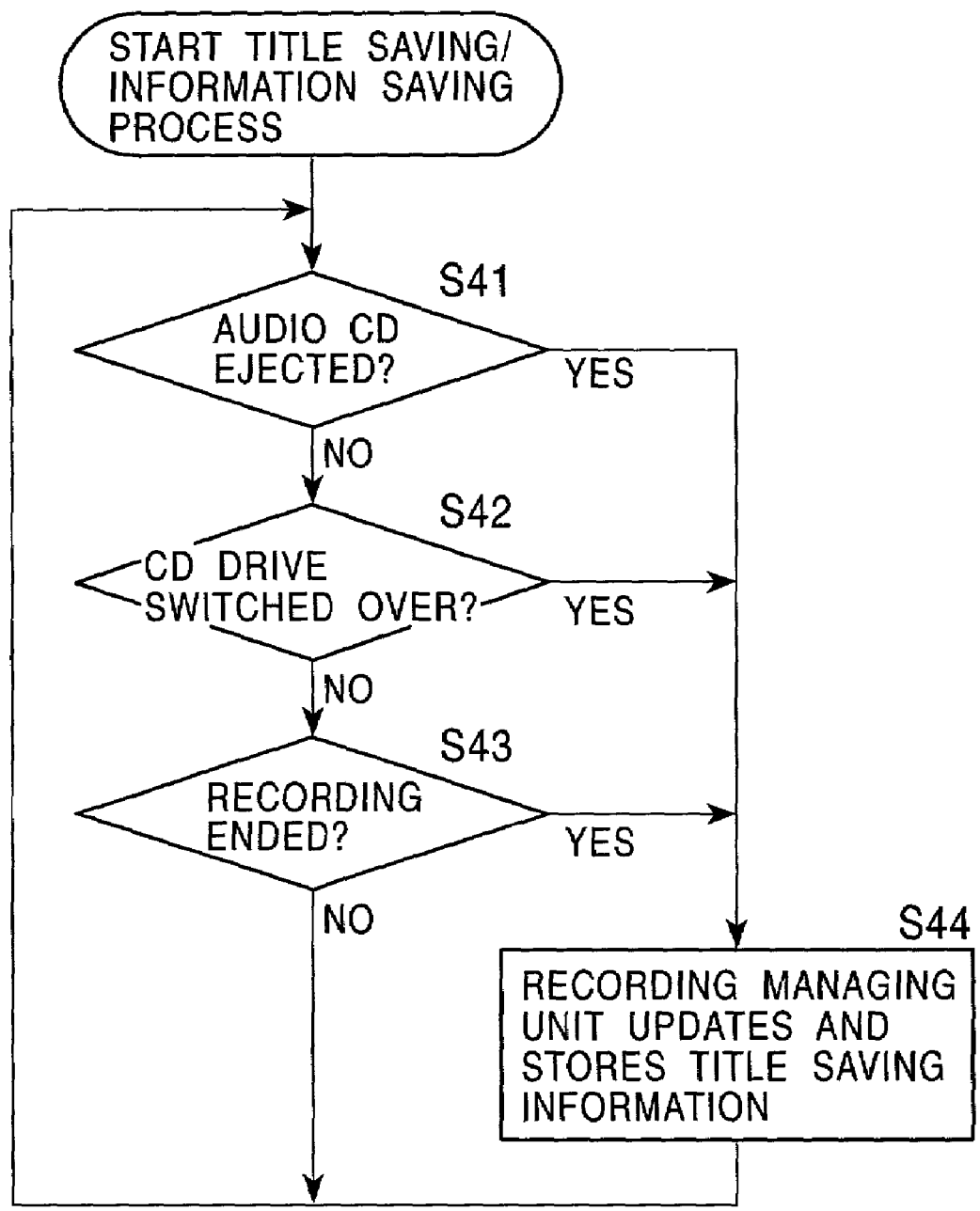
FIG. 13 is a flowchart describing saving processing for title saving information.

Next, description of the saving processing for title saving information will be described with reference to the flowchart shown in FIG. 13. In step S41, the audio recording managing unit 101 judges whether or not the audio CD mounted on the drive 22 has been ejected by clicking the eject button 211 for example (i.e., whether or not ejecting processing has been performed), and in the event that judgment is made that the audio CD has not been ejected, the processing proceeds to step S42.

In step S42, the audio recording managing unit 101 judges whether or not the drive has been switched by the user clicking on the CD drive display space 215 being clicked to display a drop-down list, and in the event that judgment is made that the CD drive has been switched over, the processing proceeds to step S43.

In step S43, the audio recording managing unit 101 judges whether or not audio recording has been completed, i.e., whether the audio recording processing of the multiple contents set as a play list has been completed for example, and in the event that judgment is made that the audio recording processing of the contents has not been completed, the processing returns to the processing in step S41, and the subsequent processing is repeated.

In the event that judgment is made in step S41 that the audio CD has been ejected, in the event that judgment is made in step S42 that the CD drive has been switched over, and in the event that judgment is made in step S43 that the audio recording processing has completed, the audio recording managing unit 101 in step S44 saves the album title and title information of the present CD as title saving information, in the internal memory (i.e., overwrites the information).

That is, while the application software is activated, the audio recording managing unit 101 constantly monitors CD ejecting, drive switching, and audio recording processing completion, and in the event that any of these are executed, rewrites the title saving information.

Due to the above processing, desired contents can be played by selecting the contents in the window shown in FIG. 10 and clicking the play button 217b for example, but also a desired play list can be played all at once simply by clicking a predetermined icon from a state wherein application software is not activated.

Next, description will be made regarding the processing wherein a shortcut icon corresponding to a recorded play list is generated and wherein multiple contents registered in a play list are played all at once by clicking the shortcut icon in a state that the above-described window has not been brought up (in a state wherein the application software is not activated).

Figure 14:
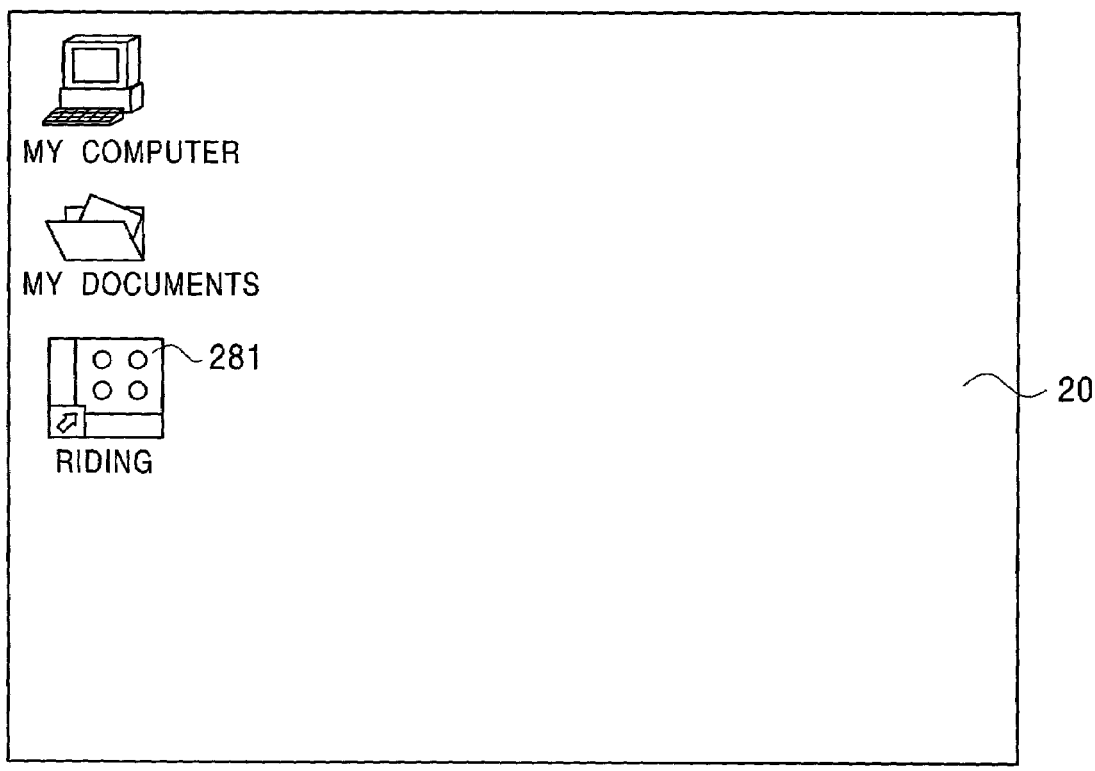
FIG. 14 is a diagram illustrating a display example of a shortcut icon.

For example, dragging the play list name display portion 252a showing "RIDING" and dropping this on the screen at a place other than the window of the application software (e.g., the desktop screen of Windows 98 (a registered trademark)) generates a shortcut icon 281 such as shown in FIG. 14 wherein the play list ID corresponding to "RIDING" is registered, which is displayed on the display 20.

Figure 15:
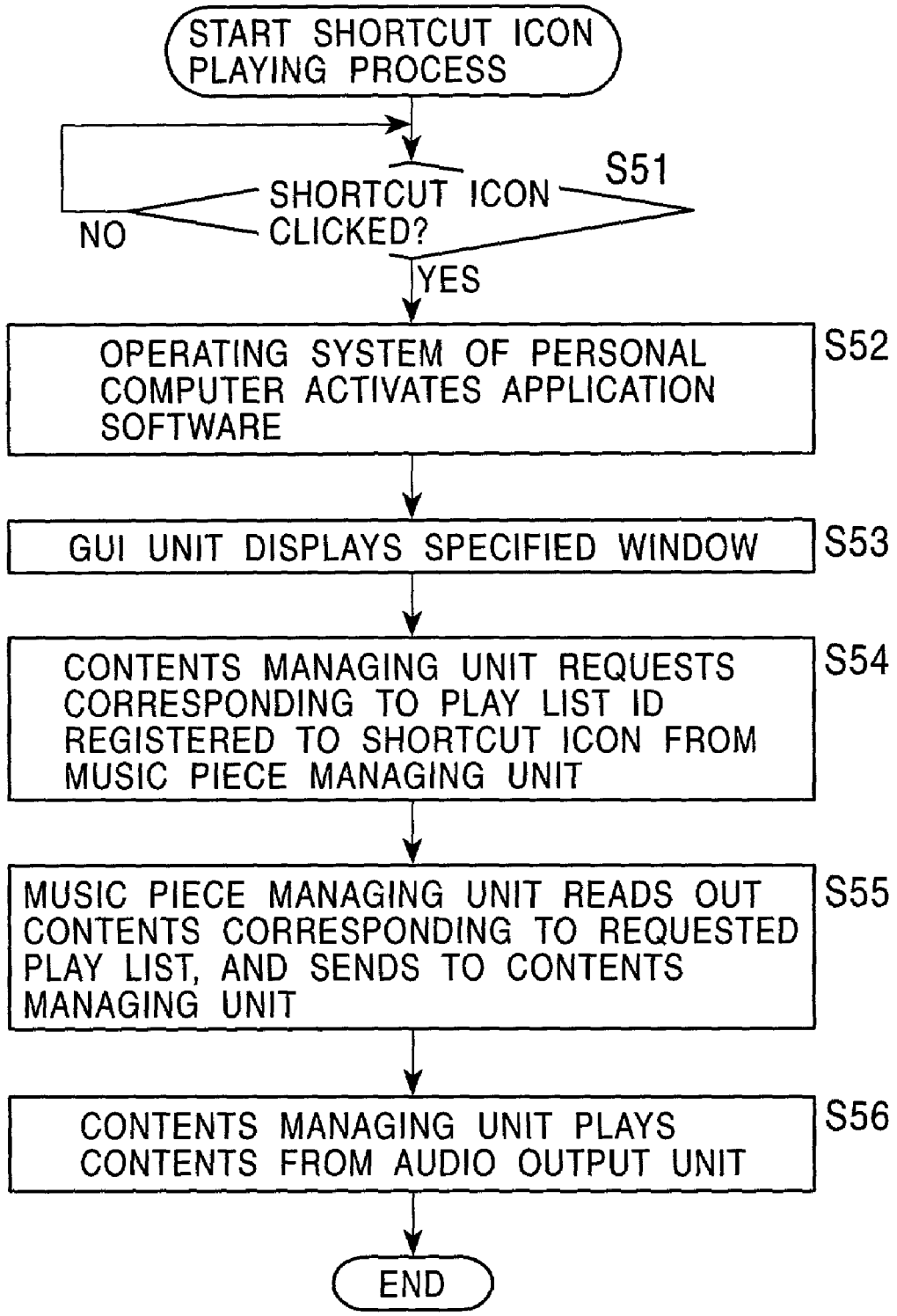
FIG. 15 is a flowchart describing shortcut icon playing processing.

Now, the playing processing using this shortcut icon 281 will be described with reference to the flowchart shown in FIG. 15.

In step S51, the operating software being executed by the CPU 11 of the personal computer 1 judges whether or not the shortcut icon has been clicked. This is repeated until it is clicked, upon which the processing proceeds to step S52.

In step S52, the operating system activates the application software for the contents managing program. In step S53, the GUI unit 100 of the activated contents managing program displays a predetermined window. In this case, "RIDING" is displayed on the shortcut icon 281, so a window in the state with the play list tab 203 active as shown in FIG. 10 for example, is displayed. Of course, arrangements may be made wherein other windows are displayed.

In step S54, the contents managing unit 102 makes a request to the music piece managing unit 104 for the contents having the play list ID registered to the shortcut icon 281. In this case, the shortcut icon 281 is displayed as "RIDING", and the contents of the play list ID corresponding to the play list "RIDING", i.e., the contents of "RIDING", "TEN LONG", "THREE", and "I", are requested from the music piece managing unit 104.

In step S55, the music piece managing unit 104 causes the file searching unit 106 to search for contents corresponding to the requested play list ID from the database 107, to be read out from the music piece file storing unit 108 and sent to the contents managing unit 102. That is to say, in this case, the music piece managing unit 104 sequentially sends the contents of "RIDING", "TEN LONG", "THREE", and "I" to the contents managing unit 102.

In step S56, the contents managing unit 102 plays the predetermined contents from the speaker 24 via the PC plugin 109 and audio output unit 110. In this case, the audio output unit 110 sequentially outputs the contents of "RIDING", "TEN LONG", "THREE", and "I", from the speaker 24.

Thus, generating a shortcut icon 281 which is displayed on the display allows the user to play multiple contents registered in a desired play list simply by clicking on the shortcut icon 281.

Figure 16:
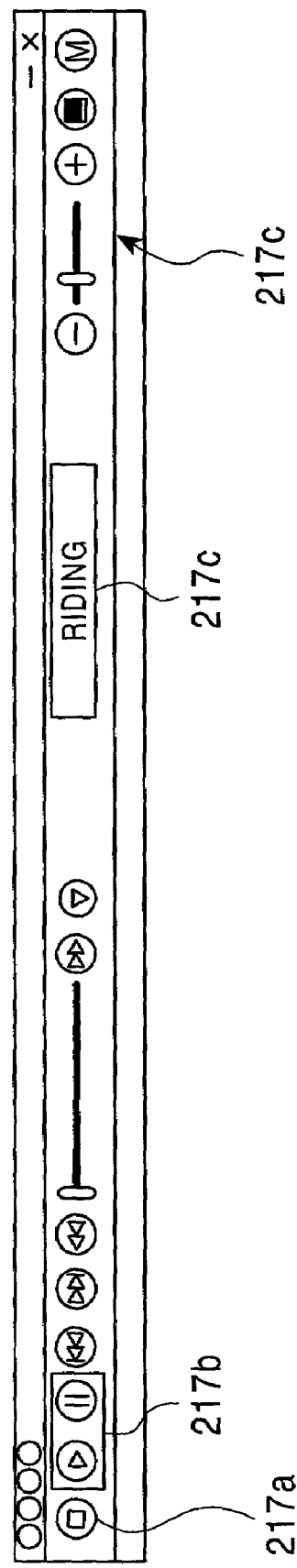
FIG. 16 is a diagram illustrating a display example of a window displayed on the display at the time of the shortcut icon playing processing.

Also, in the processing of the above step S53, the window which the GUI unit 100 displays on the display 20 may be, for example, a window wherein the play list tab 203 is active as with that shown in FIG. 10, or may be a window wherein another tab is active. For example, an arrangement may be made wherein, as shown in FIG. 16, the GUI unit 100 displays only a task bar 217 called a "simple mode window". Further, an arrangement may be made wherein the window which the GUI unit 100 displays on the display 20 is the window displayed last when the application software was running (i.e., the window that was being displayed when the application software was quit). Also, an arrangement may be made wherein, in the processing of step S53, the window displayed on the display 20 is minimized, i.e., the window is not displayed on the display and only the contents a replayed from the speaker 24.

Further, in the event that a play list is made up of contents of a certain CD album for example, the shortcut icon 281 may display an image of the jacket of the CD.

While the above series of processes can be executed by hardware, this can also be executed by software. In the event of executing the series of processes by software, the program making up the software is provided in dedicated hardware which is assembled into a computer, or is installed to, for example, a general-purpose personal computer, capable of executing various functions by installing various types of programs, from a program storing medium.

A program storing medium which stores the program to be installed in a computer so as to enable the computer to execute the program comprises, as shown in FIG. 2, packaged media such as magnetic disks 41 (including floppy disks), optical disks 42 (CD-ROMs (Compact Disk Read-only Memory)), DVDs (Digital Versatile Disks), magneto-optical disks 43 (including MDs (Mini-Disks)), or semiconductor memory 44 or the like, or ROM 12 or a HDD 21 where the program is temporarily or permanently stored. Storing of the program to the program storing medium is performed using online or wireless communication media such as a Local Area Network, the Internet, digital satellite broadcasting, etc., via an interface such as a router or modem, as necessary.

In the present specification, the steps describing the programs stored in the program storing medium may of course be executed in the time sequence following the order in which they are listed, but are not restricted to being executed in this time sequence, and may be executed in parallel or individually.

Also, in the present specification, the term "system" represents all equipment made up of multiple devices.

With the information processing apparatus and method, and program storing medium, according to the present invention, at the time of contents recorded on a first recording medium being recorded onto a second recording medium, information regarding the contents is stored as recording history information, and at the time of the contents recorded on the first recording medium being recorded to the second recording medium again, the information regarding the contents stored as recording history information is searched for and displayed. Accordingly, erroneously making multiple audio recordings of contents already recorded in the past can be avoided, thereby preventing wasting the capacity of the second recording medium, and further, in the event of recording the same contents multiple times, the task of inputting information regarding the contents can be omitted.

What is claimed is:

1. An information processing apparatus having functions for recording contents recorded on a first recording medium onto a storage unit of said apparatus, said apparatus comprising:
   a recording unit configured to record the contents of the first recording medium onto the storage unit;
   a history storing unit configured to store recording history information including an indication whether or not each track on the first recording medium has been previously recorded into the storage unit when the contents of the first recording medium are recorded onto the storage unit by said recording unit;
   a determining unit configured to determine whether or not a track on the first recording medium has been previously recorded onto the storage unit by said recording unit based on said recording history information stored in said history storing unit;
   a display; and
   display control unit configured to control display of information on said display regarding any track on the first recording medium that has not been previously recorded onto the storage unit as determined by said determining unit,
   wherein said display control unit is configured to initially provide a display indicating any track on the first recording medium that has not been previously recorded onto the storage unit with an associated selection box, said display control unit being further configured to permit inserting a mark into each displayed selection box in order to select the track associated with the selection box containing the inserted mark for recording by said recording unit from the first recording medium onto the storage unit and to permit removing any mark previously inserted into any selection box to deselect the track associated with the mark so removed so that the recording by said recording unit from the first recording medium onto the storage unit does not occur for any of the associated tracks with marks removed from their associated selection box.

2. An information processing apparatus according to claim 1, wherein said recording history information contains audio recording history information which records the number of times that audio recording has been made for each track of the first recording medium, title saving information of the contents, and play list information.

3. The information processing apparatus according to claim 1, further comprising a check-in unit configured to render unusable the contents recorded onto a second recording medium from the first recording medium,
   wherein said storing unit is further configured to store information regarding the contents as second recording history information at the time of the contents recorded onto the second recording medium being rendered unusable, and
   wherein said second recording history information includes a check-out number which is decremented when said recording unit records the contents on the first recording medium onto the second recording medium and is incremented when said check-in unit renders unusable the contents recorded onto the second recording medium from the first recording medium.

4. The information processing apparatus according to claim 1, wherein said inserting of the mark into the associated selection box and the clearing any mark inserted into any selection box to deselect the track associated with the mark so cleared are responsive to manual selection or deselection operations.

5. The information processing apparatus according to claim 1, wherein said display control unit displays indicia indicating whether or not recorded history information is present in said apparatus for the contents of the first recording medium.

6. An information processing apparatus according to claim 1, further comprising:
   judging unit for judging whether a predetermined recording medium is mounted to the apparatus based on a media specific identification information,
   wherein said storing unit stores the recording history information associating with media specific identification information of the first recording medium, and
   wherein said determining unit determines when the first recording medium is mounted.

7. An information processing method for an information processing apparatus having functions for recording contents recorded on a first recording medium onto a storage unit of the apparatus, said method comprising:
   recording the contents of the first recording medium onto the storage unit;
   storing information regarding each track on the first recording medium as recording history information in a history storing unit of the apparatus at the time the contents of the first recording medium are recorded onto the storage unit in said recording step;
   determining whether a track on the first recording medium was previously recorded to the storage unit of the apparatus based on said recording history information stored in the history storing unit of apparatus;
   controlling display of information on a display of the apparatus so that any track that was not previously recorded onto the apparatus is displayed with an associated selection box;
   selecting a particular track that was not previously recorded for recording in said recording step from the first recording medium onto the storage unit by inserting a mark into the associated selection box; and deselecting any selected particular tracks by manually removing the mark from the selection box so that deselected particular tracks are not recorded in said recording step from the first recording medium onto the storage unit.

8. The information processing method according to claim 7, further comprising rendering unusable the contents recorded onto a second recording medium from the first recording medium, wherein said storing step further stores information regarding the contents as second recording history information at the time of the contents recorded onto the second recording medium being rendered unusable, and wherein said second recording history information includes a check-out number which is decremented when said recording step records the contents on the first recording medium onto the second recording medium and is incremented when said rendering unusable step renders unusable the contents recorded onto the second recording medium from the first recording medium.

9. The information processing method according to claim 7, wherein said inserting of the mark into the associated selection box and the removing the mark from the associated selection box to deselect the particular track associated with the mark are respectively responsive to manual selection or deselection operations.

10. The information processing method according to claim 7, wherein said display control step displays indicia indicating whether or not recorded history information is present in said apparatus for the contents of the first recording medium.

11. The information processing method according to claim 7, further comprising:

a judging step for judging whether a predetermined recording medium is mounted to the apparatus based on a media specific identification information, wherein said storing step stores the recording history information associating with media specific identification information of the first recording medium, and wherein said determining step determines when the first recording medium is mounted.

12. A program storing medium storing a computer-readable information processing program for controlling an information processing apparatus having functions for recording contents recorded on a first recording medium onto a storage unit of the apparatus, said program comprising:

code controlling recording of the contents of the first recording medium onto the storage unit;

code controlling storing of information regarding each track on the first recording medium as recording history information in a history storing unit of the apparatus at the time the contents of the first recording medium are recorded onto the storage unit in said recording control step;

code determining whether a track on the first recording medium was previously recorded or not to the storage unit of the apparatus based on said recording history information stored in the a history storing unit of apparatus;

code controlling display of information on a display of the apparatus so that any track that was not previously recorded onto the apparatus is displayed with an associated selection box;

code selecting a particular track that was not previously recorded for recording from the first recording medium onto the storage unit by inserting a mark into the associated selection box; and code deselecting a selected particular track by removing the mark from the associated selection box so that a deselected particular track is not recorded from the first recording medium onto the storage unit.

13. The program storing medium storing a computer-readable information processing program according to claim 12, said program further comprising code controlling the rendering unusable of the contents recorded onto a second recording medium from the first recording medium, wherein controlling recording further controls storing of information regarding the contents as second recording history information at the time of the contents recorded onto the second recording medium being rendered unusable said rendering unusable control step, and wherein said second recording history information includes a check-out number which is decremented when said recording control step records the contents on the first recording medium onto the second recording medium and is incremented when said controlling the rendering unusable step renders unusable the contents recorded onto the second recording medium from the first recording medium.

14. The program storing medium according to claim 12, wherein said code for the display control step displays indicia indicating manual selection or deselection of tracks for recording in said recording control step from the first recording medium to the storage unit.

15. The program storing medium according to claim 12, wherein said code controlling display controls display of indicia indicating whether or not recorded history information is present in said apparatus for the contents of the first recording medium.

16. The program storing medium storing a computer-readable information processing program according to claim 12, said program further comprising:

code judging whether a predetermined recording medium is mounted to the apparatus based on a media specific identification information, wherein said storing control step stores the recording history information associating with media specific identification information of the first recording medium, and wherein said determining step determines when the first recording medium is mounted.

17. An information processing apparatus for transferring contents from a first recording medium to a second recording medium, said apparatus comprising:

means for determining whether or not recorded history information is present in said apparatus for the contents of the first recording medium;

means for selecting a portion or portions of the contents for recording from the first recording medium to the second recording medium, said means for selecting including, display providing means for providing the portion or portions with an associated selection box and mark on a display of the apparatus, insertion means for inserting a mark into each displayed selection box in order to select the portion or portions associated with the selection box containing the inserted mark, and removing means for removing a mark inserted into any selection box to deselect the portion or portions associated with the selection box previously containing a removed mark;

means for recording the selected portion or selected portions of the contents from the first recording medium to the second recording medium;

means for storing recorded history information regarding the selected portion or selected portions of the contents recorded from the first recording medium to the second recording medium; and means for displaying a list on the display of said apparatus indicating the selected portion or selected portions and a non-selected portion or non-selected portions of the contents, wherein said recording means records from the first recording medium to the second recording medium the displayed selected portion or selected portions, and wherein said selecting means initially, automatically selects a portion or portions of the contents of the first recording medium for recording that do not have recorded history information present in said apparatus for display on said display with the associated selection boxes, and wherein said selecting means initially does not select portion or portions of the contents of the first recording medium for recording that have recorded history information present in said apparatus for display on said display with the associated selection boxes.

18. The information processing apparatus according to claim 17, wherein said insertion means provides for manual selection to insert the mark and said removing means provides for manual deselection to remove the mark.

19. The information processing apparatus according to claim 17, further comprising means for displaying indicia indicating whether or not recorded history information is present in said apparatus for the contents of the first recording medium.

20. An information processing method for an information processing apparatus for transferring contents from a first recording medium to a second recording medium, said method comprising:

determining whether or not recorded history information is present in said apparatus for the contents of the first recording medium;

selecting a portion or portions of the contents for recording from the first recording medium to the second recording medium, said selecting including, displaying an indication of the portion or portions with an associated selection box and mark on a display of the apparatus, inserting a mark into each displayed selection box in order to select the portion or portions associated with the selection box containing the inserted mark, and removing a mark inserted into any selection box to deselect the portion or portions associated with the selection box previously containing a removed mark;

recording the selected portion or selected portions of the contents from the first recording medium to the second recording medium;

storing recorded history information regarding the selected portion or selected portions of the contents recorded from the first recording medium to the second recording medium; and displaying a list on the display of the apparatus indicating the selected portion or selected portions and a non-selected portion or non-selected portions of the contents, wherein said recording step records from the first recording medium to the second recording medium the displayed selected portion or selected portions, and wherein said selecting step includes initially, automatically selecting portion or portions of the contents of the first recording medium for recording that do not have recorded history information present in said apparatus for display on said display with the associated selection boxes, and wherein said selecting step initially does not select portion or portions of the contents of the first recording medium for recording that have recorded history information present in said apparatus for display on said display with the associated selection boxes.

21. The information processing method according to claim 20, wherein said inserting includes allowing manual selection to insert the mark and said removing provides for manual deselection to remove the mark.

22. The information processing method according to claim 20, further comprising displaying indicia indicating whether or not recorded history information is present in said apparatus for the contents of the first recording medium.

23. A program storing medium recording a computer-readable information processing program for controlling an information processing apparatus for transferring contents from a first recording medium to a second recording medium, said program comprising:

code determining whether or not recorded history information is present in said apparatus for the contents of the first recording medium;

code selecting a portion or portions of the contents for recording from the first recording medium to the second recording medium, said code for selecting including, code displaying an indication of the portion or portions with an associated selection box and mark on a display of the apparatus, code inserting a mark into each displayed selection box in order to select the portion or portions associated with the selection box containing the inserted mark, and code removing a mark inserted into any selection box to deselect the portion or portions associated with the selection box previously containing a removed mark;

code controlling recording of the selected portion or selected portions of the contents from the first recording medium to the second recording medium;

code controlling storing of recorded history information regarding the selected portion or selected portions of the contents recorded from the first recording medium to the second recording medium; and code controlling displaying of a list on the display of the apparatus indicating the selected portion or selected portions and a non-selected portion or non-selected portions of the contents, wherein said code controlling recording is configured to control recording from the first recording medium to the second recording medium the displayed selected portion or selected portions, and wherein said code selecting is configured to initially, automatically select portion or portions of the contents of the first recording medium for recording that do not have recorded history information present in said apparatus for display on said display with the associated selection boxes, and wherein said code selecting initially does not select portion or portions of the contents of the first recording medium for recording that have recorded history information present in said apparatus for display on said display with the associated selection boxes.

24. The program storing medium according to claim 23, wherein said code inserting provides for manual selection to insert the mark and said code for removing provides for manual deselection to remove the mark.

25. The program storing medium storing a computer-readable information processing program according to claim 23, said program further comprising code controlling displaying of indicia indicating whether or not recorded history information is present in said apparatus for the contents of the first recording medium.

26. An information processing apparatus for recording contents stored on a recording medium, said apparatus comprising:
- a storage unit configured to store recording history information;
- a determining unit configured to determine whether or not one or more tracks on the recording medium were previously recorded onto said storage unit based on said recording history information;
- a display configured to display one or more selected tracks for recording from the recording medium onto said storage unit;
- a display control unit configured to control a display of information on said display to initially indicate as selected tracks the one or more tracks on the recording medium that were determined as not being previously recorded onto said storage unit along with an associated selection box, said display control unit being further configured to permit inserting a mark into each displayed selection box in order to select the one or more tracks associated with each selection box containing the inserted mark for recording by said recording unit from the first recording medium onto the storage unit and to permit removing any mark inserted into any selection box to deselect the one or more tracks associated with each mark so removed so that the recording by said recording unit from the first recording medium onto the storage unit does not occur for any of the associated tracks with marks removed from their associated selection box; and
- a recording unit configured to record said one or more selected tracks from the first recording medium onto said storage unit.

27. The information processing apparatus according to claim 26, wherein said inserting of the mark into the associated selection box and the removing of any mark inserted into any selection box to deselect the track associated with the mark so removed are responsive to manual selection or deselection operations.

28. An information processing method for an information processing apparatus for recording contents stored on a recording medium, said method comprising:
- determining whether or not one or more tracks on the recording medium were previously recorded onto a storage unit of the apparatus based on recording history information stored in the storage unit;
- controlling a display of information on a display of the apparatus to initially indicate that the one or more tracks on the recording medium that were determined as not being previously recorded onto the storage unit are one or more selected tracks for recording from the recording medium onto the storage unit by displaying an indication of the one or more tracks with a corresponding selection box;
- selecting the one or more tracks on the recording medium that were determined as not being previously recorded onto the storage unit track for recording from the recording medium onto the storage unit by inserting a mark into the associated selection box;
- deselecting any selected one or more of the tracks on the recording medium by removing the mark from the selection box so that deselected particular tracks are not recorded from the first recording medium onto the storage unit; and
- recording the one or more selected tracks from the first recording medium onto the storage unit.

29. The information processing method according to claim 28, wherein said inserting the mark into the associated selection box and said removing the mark from the associated selection box are manually initiated.

30. A program storing medium recording a computer-readable information processing program for controlling an information processing apparatus for recording contents stored on a first recording medium, said program comprising:
- code determining whether or not one or more tracks on the recording medium were previously recorded onto a storage unit of the apparatus based on recording history information stored in the storage unit;
- code controlling a display of information on a display of the apparatus to initially indicate that the one or more tracks on the recording medium that were determined as not being previously recorded onto the storage unit are one or more selected tracks for recording from the recording medium onto the storage unit by displaying an indication of the one or more tracks with a corresponding selection box;
- code selecting the one or more tracks on the recording medium that were determined as not being previously recorded onto the storage unit track for recording from the recording medium onto the storage unit by inserting a mark into the associated selection box;
- code deselecting any selected one or more of the tracks on the recording medium by removing the mark from the selection box so that deselected particular tracks are not recorded from the first recording medium onto the storage unit; and
- code recording the one or more selected tracks from the first recording medium onto the storage unit.

31. The program storing medium according to claim 30, wherein said code for inserting the mark into the associated selection box and said removing the mark from the associated selection box are manually initiated.

* * * * *